United States Patent [19]

Kennedy et al.

[11] Patent Number: 5,246,782
[45] Date of Patent: Sep. 21, 1993

[54] LAMINATES OF POLYMERS HAVING PERFLUOROCYCLOBUTANE RINGS AND POLYMERS CONTAINING PERFLUOROCYCLOBUTANE RINGS

[75] Inventors: Alvin P. Kennedy, Midland, Mich.; Larry D. Bratton; Zdravko Jezie, both of Lake Jackson, Tex.; Eckel R. Lane; Donald J. Perettie, both of Midland, Mich.; W. Frank Richey, Lake Jackson, Tex.; David A. Babb, Lake Jackson, Tex.; Katherine S. Clement, Lake Jackson, Tex.

[73] Assignee: The Dow Chemical Company, Midland, Mich.

[21] Appl. No.: 625,588

[22] Filed: Dec. 10, 1990

[51] Int. Cl.$^5$ .................. C07C 327/00; B32B 3/00
[52] U.S. Cl. .................. 428/421; 428/423.3; 428/423.4; 428/423.7; 428/474.2; 428/475.5; 428/475.6; 428/901; 428/934; 437/228
[58] Field of Search .................. 428/439, 901, 423.3, 428/421; 560/242, 87, 60; 568/230

[56] References Cited

U.S. PATENT DOCUMENTS 5,021,602 6/1991 Clement et al. .................. 568/669

FOREIGN PATENT DOCUMENTS 0460523 5/1991 European Pat. Off. .

*Primary Examiner*—Patrick J. Ryan
*Assistant Examiner*—R. C. Weisberger

[57] ABSTRACT

A laminate has at least two layers, at least one of which comprises a polymer having more than one perfluorocyclobutane group. Such polymers impart qualities of enviornmental or protection, chemical and solvent resistance, hydrolytic stability, lubricity, low dielectric, hydrostatic stability, weatherability, flame resistance, chemical resistance, hydrolytic stability, lubricity, environmental protection, scratch resistance, solvent resistance, surface passivation, water repellancy, lower surface refractive index, lower surface coefficient of friction, fluid barrier properties, oil repellancy, thermal stability, and/or reduced moisture pick-up. Additionally, the coatings are optically clear, easy to apply either neat, in a solvent or otherwise, have relatively low cure temperatures for their temperature resistance, and exhibit insulating and planarizing capabilities.

21 Claims, No Drawings

LAMINATES OF POLYMERS HAVING PERFLUOROCYCLOBUTANE RINGS AND POLYMERS CONTAINING PERFLUOROCYCLOBUTANE RINGS

This invention relates to laminates of polymers containing more than one perfluorocyclobutane ring.

Laminates are materials having more than one layer. While in the simplest form a laminate has mutually coextensive discrete layers, the term also includes layered materials wherein one or more layers may have dimensions different from at least one other layer. For instance, a middle layer of three layers may extend beyond the edges of the other two layers or one or more of the other layers may extend beyond the edges of the middle layer. Also, layers may not remain discrete after formation of a laminate. For instance, in a laminate of three layers, a middle layer may be discontinuous, e.g. a loosely woven material, and layers contiguous thereto may be of the same or miscible compositions such that in a lamination process, those layers merge through discontinuities in the middle layer. Laminates also include coated objects wherein one layer may cover all or substantially all surfaces of another layer or wherein what may be considered layers above and below an object may join in at least one place or along one or more edges. Laminates in their simplest form have relatively planar layers, but the term includes non-planar materials of any shape including wires, fibers, pipes, tubes, bowls, pots, spheres, cubes, bricks, irregularly shaped objects, discontinuous materials and the like.

A wide variety of laminates are known. Their properties and uses depend on the materials used for the layers. While laminates having layers of polymers are often formed and useful for the properties of the polymers, polymers seldom have high temperature resistance, fire retardancy and other properties that would be desirable in laminates.

SUMMARY OF THE INVENTION

Polymers having more than one perfluorocyclobutane group have recently been discovered and include polymers thermally formed from monomers having at least two perfluorovinyl groups and interpolymers of compounds having at least one perfluorocyclobutane ring and at least two functional groups reactive with di- or poly- functional compounds to form polymers.

The present invention, in one aspect, is a laminate having at least two layers at least one of which comprises a polymer having more than one perfluorocyclobutane group. Such laminates are particularly useful in electronics, building materials, optics for applications requiring heat or weather resistance and the like.

The crosslinked polymers exhibit enhanced solvent resistance and increased mechanical strength, without loss of advantageous electrical properties, such as low dielectric constant and dissipation factor.

The invention includes electronic devices and computers comprising such laminates.

In another aspect the invention includes a process of preparing a laminate comprising a step of coating at least one material with a polymer having more than one perfluorocyclobutane group. In yet another aspect, the invention includes a process for preparing a laminate comprising adhering at least one layer of a polymer having more than one perfluorocyclobutane group and at least one layer of a material having a composition different from the polymer.

DETAILED DESCRIPTION OF THE INVENTION

Laminates of the invention have at least two layers, at least one of which is a polymer having perfluorocyclobutane rings. The other layer(s) are any material, preferably at least one layer is a material having properties, preferably physical or chemical properties different from the layer having perfluorocyclobutane rings. More preferably the properties are such that the layer(s) of polymer improves at least one property of the laminate relative to the properties of the rest of the laminate without the polymer layer(s). For instance, a layer of polymer may be added to effect, preferably to improve, passivity, mechanical strength, flame retardancy, smoothing or planarity, receiving an image, selective removal, hydrolytic stability, moisture resistance, chemical resistance, heat resistance, weatherabitily, low dielectric nature (insulating),wear resistance, scratch resistance.

The layer(s) other than the layer(s) of polymer having perfluorocyclobutane rings are suitably such materials as wood, metal, ceramics, glass, other polymers, paper, paper board cloth, woven fibers, nonwoven fiber mats, synthetic fibers, Kevlar TM, carbon fibers, silicon and other inorganic substrates and the like. The materials selected for the layers depend on the desired application. Preferred materials include glass, including glass fibers (woven, non-woven or strands), ceramics such as metals such as Al (aluminum), Mg (magnèsium), Ti (titanium), Cu (copper), Cr (chromium), Au (gold), Ag (silver), W (tungsten), stainless steel, Hastalloy, carbon steel and polymers such as epoxy resins, polyimides, benzocyclobutane polymers, other thermosets, and the like and polystyrene, polyamides, polycarbonates, polyesters and other thermoplastics. Optionally, the other layer(s) may include at least one layer of polymer containing perfluorocyclobutane rings, said layer(s) preferably having a different composition, for instance different in polymer structure, molecular weight, additives, crosslinking type or density.

It should be noted that the layer(s) other than at least one of a polymer having perfluorocyclobutane rings can be of any shape, generally determined by the purpose of the laminate. For instance, the other layer(s) are suitably disks, plates, wires, tubes, boards, spheres, rods, pipes, cylindrical, bricks, fibers, woven or non-woven fabrics, yarns including comingled yarns, ordered polymers, woven or non woven mat. In each case the shape is optionally, hollow or solid, in the case of hollow objects, the polymer layer(s) is optionally inside and/or outside. The other layer is optionally porous such that the polymer layer(s) penetrate, such as graphite mat or fabric, glass mat or fabric, a scrim, particulate material and the like.

Laminates of the invention have at least one layer of polymer having at least two perfluorocyclobutane rings. Such polymers and the methods of making them and monomers useful in their preparation are disclosed in U.S. application Ser. Nos. 364,667, 364,666, 364,686, 364,665, all filed Jun. 9, 1989 (now U.S. Pat. Nos. 5,037,917; 5,037,919; 5,021,602; 5,023,380); U.S. application Ser. No.534,819 filed Jun. 7,1990 (now U.S. Pat. No. 5,066,746); U.S. application Ser. No. 451,404 filed Dec. 15, 1989 (now U.S. Pat. No. 5,037,918) which are incorporated herein by reference with respect to the preparation of monomers and polymers useful in the practice of the present invention.

Preferably, polymers used in the practice of the invention are formed by thermal reaction of monomers, including oligomers or low molecular weight polymers, having at least two dimerizable perfluorovinyl groups such that perfluorocyclobutane groups are formed. A dimerizable perfluorovinyl group is a perfluorovinyl group which reacts with another such group to form a perfluorocyclobutane ring. Alternatively, the polymers are prepared by reacting monomers having at least one perfluorocyclobutane ring and at least two functional groups reactive with di- or poly-functional compounds to form interpolymers therewith.

Properties of the polymers vary with the proportion of perfluorocyclobutane rings, the nature of other portions of the polymer and other chemical and structural features of the polymers. For instance, the relative proportion by weight of the perfluorocyclobutane groups to the other molecular components of the resulting products can vary over a wide range of from 12 to 1 to 0.01 to 1, preferably from 5 to 1 to 0.02 to 1 and most preferably from 2 to 1 to 0.03 to 1. High proportions of perfluorocyclobutane groups, preferably at least about 0.1 to 1 more preferably at least about 0.25 to 1 are desirable for instance, when fluorocarbon character such as low dielectric constant is beneficial in the products. Exemplary of such products are low dielectric fluids and lubricants. Medium ranges of ratios of weights of perfluorocyclobutane groups to other molecular structures of 2 to 1 to 1 to 4 are desirable, for instance, when higher physical strength and relatively lower dielectric constants (for example, relative to conventional engineering thermoplastics) are desired, for example, in low dielectric plastics. These relatively low dielectric plastics are particularly preferred and are preferably achieved by using aromatic compounds substituted with trifluorovinyl groups, most preferably, with trifluorovinyl ether groups. Very low proportions of the perfluorocyclobutane groups result, for instance, when low molecular weight oligomers (for example, in the range of 1000 to 20,000) are terminated by trifluorovinyl groups and then thermally dimerized to form higher molecular weight polymers.

Any monomer having at least two dimerizable perfluorovinyl groups is suitably used to form polymers used in the practice of the present invention.

In the thermal polymerization of diperfluorovinyl compounds, substantially linear polymers having little branching are believed to be formed. In the practice of some embodiments of the present invention, it is preferred to crosslink such polymers to achieve properties such as improved (relative to the uncrosslinked polymer) mechanical strength, solvent resistance, hydrolytic stability, thermal stability, and/or wear resistance. At least two types of crosslinking are observed. A first type of crosslinking involves the use of monomers having at least three perfluorovinyl groups; such crosslinking is referred to herein as "polyfunctional crosslinking." A second type of crosslinking is observed when certain types of monomers are used, and because it is believed that this second type of crosslinking involves certain aromatic structures in the backbone of the polymer, it is referred to herein as "backbone crosslinking."

Without crosslinking, solid polymers useful in the invention are generally thermoplastic except in the case of partially polymerized monomers which are referred to herein as prepolymers or B-staged polymers, which may be partially crosslinked and/or not thermoplastic. Viscosity of either a melt or solution of the polymer increases as crosslinking occurs until the gel point and resulting insolubility is reached. Backbone crosslinked polymers are preferably elastomeric, that is, the polymer can generally regain its shape after deformation. That deformation is indicated by elongation measurements greater than about 100 percent at temperatures above the glass transition temperature (Tg) of the polymer. Backbone crosslinked polymers preferably retain their elastomeric properties at temperatures of from their glass transition temperatures to the temperatures at which they are observed to degrade, preferably about 400° C. The glass transition temperature varies with the composition of the polymer.

Backbone crosslinking also increases a polymer's tensile strength as measured by the procedures of ASTM D882-83. The increase is preferably up to 1000 percent, more preferably from 10 percent to 500 percent, most preferably of from 10 percent to 100 percent increase. Also the polymer's tensile and flexural modulus as measured by the procedures of ASTM D882-83 and ASTM D790-81, respectively, also increases, preferably up to 1000 percent, more preferably of from 10 percent to 500 percent, most preferably of from 10 percent to 100 percent. Additionally, the fluorine-containing structures of such crosslinked polymers preferably retain relatively low dielectric constants.

Such properties are useful in laminates such as disk substrates, media binders, optical waveguides, fiber bundles, circuit boards, optical cladding, encapsulated objects and the like.

Although any monomer having two dimerizable perfluorovinyl groups and which is crosslinkable is suitably used for backbone crosslinking, polymers used in the invention are preferably prepared from monomers having two perfluorovinyl groups separated by at least one hydrocarbyl group having at least one carbon atom between the perfluorovinyl groups. The polymer preferably has a backbone comprising perfluorocyclobutane groups, linking structures and hydrocarbon containing groups.

When the perfluorovinyl groups are attached to aliphatic carbons or separated from aliphatic carbons by single atoms such as oxygen, the perfluorovinyl groups are preferably primary or secondary. Preferably, to avoid rearrangement and facilitate polymer formation and crosslinking the monomers have structures such that resulting polymers have hydrocarbyl groups (preferably aromatic rings), perfluorocyclobutane rings and at least one non-carbon atom such as oxygen, silicon, boron, phosphorus, nitrogen, selenium, tellurium and/or sulfur atom (each optionally substituted) in the backbones.

The monomers preferably have a structure represented by the following Formula I:

Formula I

$$CF_2=CF-X-R-(X-CF=CF_2)_m$$

wherein R represents an, optionally inertly substituted group; each X is independently a bond or any group which links R and a perfluorovinyl group (hereinafter linking structures), said structures being inert; m+1 is the number of $-X-CF=CF_2$ units. Advantageously, m is an integer of from 1 to 3, preferably from 1 to 2. While compounds represented by Formula I wherein m is one are especially useful for forming linear polymers, compounds wherein m is 2 or more particularly 2 or 3 are especially useful for polyfunctional crosslinking. By "inert" it is meant that the structures or substituents do not react undesirably with perfluorovinyl groups or interfere undesirably with polymerization (perfluorocyclobutane formation) of the monomers.

Linking structures X are each independently a linking structure such as a bond, an oxygen atom, carboxylic and thiocarboxylic ester groups, other sulfur containing structures, perfluoroalkylene, perfluoroalkylen:e ether, alkylene, acetylene, phosphorus containing groups such as phosphines, carbonyl and thiocarbonyl groups; seleno: telluro: nitrido; silicon-containing groups such as silanediyl, trisilanediyl tetrasilanetetrayl, siloxanediyl, disiloxanediyl, trisiloxyl, trisilazanyl, or silylthio groups; boron-containing groups such as boranediyl or methylboranediyl groups; a combination thereof, or any other group which is inert, which molecularly links R to a perfluorovinyl group, and which provides a molecular structure in which the perfluorovinyl group is sufficiently reactive to form a perfluorocyclobutane ring. For instance, X is preferably other than a perfluoroalkylene group because perfluorovinyl groups attached to perfluoroalkylene groups generally require temperatures greater than about 300° C. to dimerize and are subject to isomerization.

It is preferred that at least one of X is not a bond. More preferably, X is independently selected from the group consisting of groups having at least one noncarbon atom between the perfluorovinyl groups and R, such as groups containing oxygen, sulfur, selenium atoms, tellurium atoms, silicon, boron, phosphorus or nitrogen between R and the perfluorovinyl group, for example, oxygen atoms, sulfur atoms, (thio) carboxylic ester groups, phosphines, (thio) carbonyl groups, seleno, telluro, silanediyl, trisilanediyl, trisilazanyl or silylthio, boranediyl groups. Preferred groups have S, O, Si, N or P, more preferably S, O, or Si between R and the perfluorovinyl group, such as carbonyl, thiocarbonyl, sulfone, sulfoxy, silanediyl, amines (optionally inertly substituted), oxygen or sulfur atoms. Most preferably there is a single atom other than carbon between R and each perfluorovinyl group: even more preferably the single atom is oxygen or sulfur, among those groups preferably an ether or sulfide linkage, because monomers having such linking structures advantageously form perfluorocyclobutane groups at lower temperatures than are needed with such groups as perfluoroalkyl groups and are more stable than monomers where the perfluorovinyl group is attached directly to R, particularly when R is aromatic. Monomers having such linking structures are also relatively easily prepared.

R is suitably any inert molecular structure, preferably a molecular structure which facilitates formation of perfluorocyclobutane rings and/or polyfunctional crosslinking and/or imparts desirable physical properties to polymers or oligomers prepared from the monomers. For the purpose of imparting desirable physical properties to polymers, R preferably contains at least one carbon atom. Preferably, the carbon atom is in the molecular chain between X's because monomers having at least one carbon atom between X's when X is other than a bond, tend to have desirable stability and to produce polymers having desirable physical properties. Alternatively, the carbon atom is in a side chain: for instance, —R— can be —N(CH$_3$)—, —N(CH$_2$CH$_3$)—, —P(CH$_3$)— or —P(CH$_2$CH$_3$)—. The carbon atoms(s) in R are suitably in aliphatic, cycloaliphatic, aromatic, heterocyclic groups or combinations thereof. Additionally, R optionally contains groups or has substituents which are inert, that is which do not undesirably interfere with the formation of perfluorocyclobutane rings from perfluorovinyl groups. Inert substituents include ether, carbonyl, ester, tertiary amide, carbonate, sulfide, sulfoxide, sulfone, nitrile, alkyl phosphonate, tertiary amine, alkyl phosphate, alkyl silyl, chlorine, bromine, fluorine, alkyl, arylalkyl, alkylaryl, cycloalkyl, aromatic, heterocyclic, alkoxyl and aryloxy groups, which inert substituents are suitably in any position, for instance, in a polymer backbone between X's and/or appended to such a backbone. Carbon-containing inert substituents on R preferably contain from 1 to 50, more preferably from 1 to 12 carbon atoms because of the stability and ease of working with monomers of lower molecular weight. R, including inert substituents preferably has a molecular weight (MW) of from 14 to 20,000, more preferably from 75 to 15,000 and most preferably from 75 to 5,000. These ranges include monomeric and oligomeric R groups. In the case of monomers which are other than oligomeric, R preferably has from 1 to 50, more preferably from 6 to 50, carbon atoms because molecular weights above this reduce the contribution to properties made by the fluorine-containing substituents when R is alkyl or aromatic hydrocarbon. As previously discussed, the nature of R as well as the perfluorocyclobutane content of the polymers can vary broadly according to the type of products desired.

Preferably, for polymers having good plastic properties such as tensile strength and flexibility, at least one carbon atom of R is in the molecular chain between X's and is part of an aromatic nucleus. Aromatic groups are desirable because of improved physical properties of the polymers and ease of manufacture of the monomers. For both ease of manufacture of the monomer and monomer stability, when R is aromatic, each X is preferably independently sulfur or oxygen. The aromatic group can be any molecular structure having aromatic character, advantageously having at least one six-membered aromatic ring, suitably having any number of such six-membered rings fused together or connected by bonds or linking structures. R preferably has from 1 to 50 such rings, more preferably from 1 to 10 rings, more preferably containing from 6 to 25 carbon atoms, most preferably R has at least 2 to 4 aromatic rings to impart properties such as hardness and/or stiffness to a polymer. The aromatic fragment is suitably unsubstituted or inertly substituted. Inert substituents on an aromatic R include, for instance, the inert substituents listed for R generally. Exemplary aromatic molecular fragments include, for instance, perchlorophenylene, phenylene, biphenylene, naphthylene, dichlorophenylene, nitrophenylene, p,p'(2,2-diphenylene propane) [—C$_6$H$_4$—C(CH$_3$)$_2$—C$_6$H$_4$—]; p,p'-(2,2-diphenylene1,1,1,3,3,3 hexafluoropropane) [—C$_6$H$_4$—C(CF$_3$)$_2$—C$_6$H$_4$—], preferably biphenylene; phenylene; 9,9'-diphenylfluorene, oxydiphenylene; thiodiphenylene; 1,1,1-triphenyleneethane; 1,3,5-triphenylenebenzene; 1,3,5-(2-phenylene-2-propyl)benzene; 1,1,1-triphenylenemethane; 1,1,2,2-tetraphenylene-1,2-diphenylethane; bis(1,1-diphenyleneethyl)benzene; 1-(2-phenylene-2-propyl)-4-(1,1-diphenyleneethyl)benzene; 2,2-diphenylene propane; 2,2'-diphenylene, 1,1,1,3,3,3-hexafluoropropane: 1,1-diphenylene-1-phenylethane; naphthalene: and anthracene. Molecular weights of aromatic ring containing polymers are preferably at least about 10,000. Such aromatic groups are preferably present because they generally impart high temperature glass transition properties (Tg) and good mechanical strength (for example, as measured by differential scanning calorimetry (DSC) and tensile/flexural tests) to the polymer.

Such properties are preferred for laminates such as circuit boards, optical waveguides, and the like.

For the purpose of facilitating backbone crosslinking, more preferably, R is a group which reacts with perfluorovinyl groups residual in a substantially linear polymer to form a crosslinked or branched molecular structure. The reaction of R with the perfluorovinyl groups is suitably initiated by heat, free radicals, wave energy, or any other crosslinking initiating means, but preferably by heat. Most preferably R includes a structure having two double, triple or aromatic bonds (hereafter multiple bonds) separated by a single bond and capable of attaining a cisoid conformation. Such structures are recognized in the art as latent Diels-Alder dienes. Preferably the latent dienes are suitable for reactions of the Diels-Alder type, more preferably suitable for such reactions with perfluorovinyl groups in the monomers, most preferably suitable for such reactions with perfluorovinyl ether groups under conditions used for crosslinking. The single bond is preferably a carbon to carbon single bond. Each of the multiple bonds is independently suitably a multiple bond between any two atoms, preferably between a carbon atom and any other atom (for example, $-C=O$, $-C=C-$, $-C\equiv N$), more preferably a carbon to carbon bond. Exemplary of preferred R groups include, for instance, biphenylene, 9,9'-diphenylfluorene, fluorene, cyclopentadienylene, furan and anthracene.

Most preferably, at least one aromatic carbon atom of R is bonded directly to X, most preferably aromatic carbon atoms of R are bonded directly to each X because perfluorovinyl groups bonded to X, said X being bonded to aromatic groups are generally more reactive in forming perfluorocyclobutane rings.

Some specific combinations of X and R are especially preferred: when R is aromatic, at least one X is preferably other than a bond, more preferably neither X is a bond, because attachment of perfluorovinyl groups directly to aromatic R renders the perfluorovinyl groups more thermally and oxidatively unstable than when said groups are attached, for instance to oxygen or sulfur. When R is a perfluoroalkyl group or a perfluoroalkylether group, at least one X is preferably other than a bond, most preferably no X is a bond or a perfluoroalkyl group, because perfluorovinyl groups linked directly to perfluoroalkyl groups require temperature in excess of about 300° C. to dimerize and are subject to isomerization.

Monomers preferred for use in preparing polymers useful in the practice of the present invention are suitably prepared by any method which links molecular structures having perfluorovinyl groups to other molecular structures or which forms perfluorovinyl groups.

An exemplary method of preparing a trisperfluorovinyl ether (exemplary of monomers having more than one perfluorovinyl group) is illustrated by a process having the following steps:

(A) A trihydroxy compound such as 1,1,1-tris(4-hydroxyphenyl)ethane is converted to its sodium or potassium salt in a solvent such as water, methanol or a mixture thereof. The methanol or another solvent for the trihydroxy compound is used when the compound is not water soluble, to keep the trihydroxy compound in solution. Salt formation occurs conveniently at from about 0° C. to about 120° C. at atmospheric pressure, preferably under a nitrogen atmosphere to avoid oxidation in the case of an oxidizable trihydroxy compound.

(B) When methanol or other solvent other than water is used, it is removed, e.g. under reduced pressure at any convenient temperature and pressure with replacement of water as it is lost.

(C) The salt is dried and powdered by means within the skill in the art for example, in a drum dryer or other apparatus which provides agitation and water removal, e.g. by heat and/or reduced pressure. A dryness of less than about 1 weight percent water, preferably less than about 0.1 percent, more preferably less than about 0.02 weight percent is preferably attained in this step. If such dryness is not attained in this step, step E is alternatively used to attain said dryness.

(D) The salt is slurried in a polar, aprotic solvent suitable for achieving reaction such as DMSO (dimethyl sulfoxide), ethers, DMF (dimethyl formamide), HMPA (hexamethylphosphoramide), diglyme, tetraglyme or glyme.

(E) If dryness to less than about 1 weight percent water is not attained in step (C), an aprotic azeotropic medium such as toluene or chlorobenzene in a solvent to azeotrope medium ratio of from about 10 to 1 to about 1.5 to 1 is added, and the solution dried by the azeotropic removal of water. About half of the azeotropeic medium is removed, for example, by distillation, and the mixture is cooled below about 50° C., preferably below about 20° C.

(F) A dihalotetrafluoroethane such as 1,2-dibromotetrafluoroethane is added to form a mixture as the reaction temperature is controlled at a temperature suitable for the reaction to occur substantially without the side reaction of aromatic ring halogenation; in the case of 1,1,1-tris(4-hydroxyphenyl)ethane a temperature preferably below about 20° C. is used initially. The mixture is stirred at e.g. 18° C. to 25° C., preferably until the amount (yield) of product stops increasing (the reaction is complete) as indicated by gas chromatographic analysis of product tris-bromide.

(G) The tris-bromide is purified by means within the skill in the art:

(G1) For instance, the mixture is poured into about an equal volume of cold water, conveniently from about 0.5 to about 3 times the volume of the solution, and the product falls out as the lower layer. There is preferably sufficient cooling to offset the heat generated by admixing DMSO (or other solvent) and water. The product, a tris-bromide, is then distilled, for example, at 190° C. to 195° C./0.05 mm Hg. When trisbromides are heat stable as observed in the case of 1,1,1-tris(4-(2-bromotrifluoroethoxy)phenyl)ethane, the degree of vacuum is selected to give a convenient boiling point. Such selection is within the skill in the art.

(G2) Alternatively, the solution of product is extracted with a non-polar solvent such as a hydrocarbon, for instance hexane, using means within the skill in the art such as countercurrent extraction. The solvent is conveniently used in an amount of from about 1 to about 5 times the volume of solution of product, and the product is extracted into the hydrocarbon. The hydrocarbon is then removed by means within the skill in the art such as evaporation, conveniently under reduced pressure.

(H) The tris-bromide is used directly or, if desired, in cases where the tris-bromide is a solid it may be dissolved for ease of addition in a polar, aprotic solvent such as diglyme, tetraglyme, glyme, or a nitrile such as acetonitrile, glutaronitrile, or 3-methoxypropionitrile and added to a hot (for example 40°-135° C.) mixture of the same solvent and granular zinc to form the tris-perfluorovinyl ether (TVE). Alternatively, the tris-bromide can be added to a hot (for example 120° C.) mixture of, for example, diglyme or nitrile and granular zinc as a melt without dilution if heated above its melting point, for example to about 120° C. in the case of 1,1,1-tris(4-(2bromotrifluoroethoxy)phenyl)ethane. Temperatures above about 135° C. are preferably avoided to avoid dimerization of perfluorovinyl groups.

(I) The TVE is isolated by removing the zinc salts for example; by centrifugation, evaporating the diglyme under reduced pressure, diluting the TVE with a, preferably low boiling, solvent such as hexane, and flushing the solution through a pad of neutral alumina or other absorbent for color bodies and residual ionic species. Alternatively, the zinc salts are removed by filtration and the TVE distilled under vacuum, for example in two stages, the first to remove solvent and the second to purify the TVE. Preferably, temperatures above about 110° C. are avoided to avoid dimerization of perfluorovinyl groups. Especially when a very pure product is desired, these methods of purification are suitably combined.

Alternatively, the TVE is isolated by removing the zinc salts by filtration, evaporating the glyme (if used) under reduced pressure, diluting the TVE or its solution in a nitrile with hydrocarbon solvent for the TVE such as hexane and purifying by countercurrent extraction or similarly extracting the hydrocarbon with polar organic materials such as acetonitrile or DMSO. The pure TVE in hydrocarbon is then flushed through a pad of absorbent for color bodies and residual ionic species such as decolorizing carbon, ion exchange resins, alumina or the like.

(J) The hexane or other hydrocarbon, if used, is removed from the TVE e.g. by evaporation under reduced pressure.

Polymers produced from the preferred monomers preferably have a formula represented by the following Formula II:

Formula II

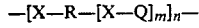

wherein R, X, and m, are defined above, Q is a perfluorocyclobutane group; and n is an integer representing the number of repeating units, which is preferably from 2 to 100,000. More preferably from 2 to 10,000, most preferably from 3 to 5,000. More preferably m is one or two. Formula II is generalized; when m is greater than one, some of the —X— Q structures represent branching and/or crosslinking.

The monomers are heated to a temperature and for a time sufficient to form perfluorocyclobutane rings. Temperatures suitable for forming perfluorocyclobutane rings differ with the structure of the monomer. In general, temperatures above about 40° C. are suitable for formation of perfluorocyclobutane rings, preferably the temperature is above about 50° C., more preferably above about 100° C., because these temperatures result in formation of the rings at successively faster rates. Temperatures above about 450° C. are preferably avoided because perfluorocyclobutane groups are generally thermally unstable above such temperatures.

Monomers having three or more dimerizable perfluorovinyl groups (hereinafter referred to as polyfunctional) are especially useful to form polymers having relatively high Tg believed to be due to polyfunctional crosslinking. From 0 to 100 percent by weight of such monomers are suitably used, preferably sufficient of the monomers having at least three perfluorovinyl groups to measurably increase the chemical resistance and/or mechanical strength of the polymer over that of a polymer of monomers having corresponding structures but with only two perfluorovinyl groups, more preferably at least about 0.05 mole percent, most preferably from 0.1 to 100 mole percent of such monomers is used. While use of lower proportions of polyfunctional monomer(s) produces, generally thermoplastic, polymers having crosslinking and corresponding properties of toughness and solvent resistance, use of sufficient polyfunctional monomers to form thermosetting polymers is useful to produce crosslinked polymers having greater chemical resistance and/or mechanical strength. The relative proportions of polyfunctional monomer which produce such polymers varies with the structure of the monomers. However, from 0.5 to 75 mole percent polyfunctional monomers used with monomers having 2 perfluorovinyl groups is sufficient to result in sufficient crosslinking in a thermoplastic polymer to reduce its solubility in a solvent.

More than one stage of polymerization is often advantageous particularly for polyfunctional monomers, to achieve desired viscosity for forming laminates. A first stage of polymerization is conveniently carried out at temperatures of from 50° C. to 400° C., preferably from 105° C. to 250° C., more preferably from 120° C. to 170° C. At least one later stage follows the first stage and is preferably carried out at a higher temperature than the first to allow the polymerization to proceed toward completion. Such later stage(s) are conveniently carried out at temperatures from that sufficient to result in additional polymerization up to the decomposition temperature of a resulting polymer, preferably from 100° C. to 450° C., preferably from 120° C. to 400° C., more preferably from 200° C. to 375° C. Those skilled in the art will recognize that the first and later stages can represent more than one stage or can be carried out using two or more temperatures and that a series of stages or a continuum of temperatures are suitably used. In addition to these stages a postcure at relative high temperature such as from 200° C. to 450° C. is optionally used. The postcure is suitably for any duration sufficient to change physical properties and insufficient to decompose the polymer, preferably from 1 minute to 1 week, more preferably at high temperatures such as from 240° C. to 450° C. for duration of from 1 minute to 24 hours. Stages of polymerization are conveniently run under conditions previously described for polymerization of the monomers. When a solvent is used in an early stage, and it is desirable to avoid bubbles that may occur as a solvent is driven off, advantageously the solvent is removed before or during a later stage.

It is found that solvent, degree of polymerization, and other parameters, for instance conditions of coating, effect coating quality and thickness. Those skilled in the art are able to determine optimum conditions for each particular polymer and coating desired. An illustrative example with variations in solvent, degree of polymerization and parameters of spin coating is given in the Examples of this invention.

Dielectric constants and static dissipation factors (as measured according to the procedures of ASTM D150-

87) preferably range from 2.2 to 3.0 and from 0.0001 to 0.005 respectively. Glass transition temperatures increase from about ambient when R is phenyl, to about 170° C. when R is biphenyl, to about 230° C. when R is 9,9-diphenylfluorene, to about 286° C. or higher when R is 1,1,1-triphenylethane.

The linear polymers advantageously are cast from solvents such as ethers, esters, aromatic hydrocarbons and chlorinated solvents, mesitylene, diglyme, o-xylene, n-butyl acetate, tetrahydrofuran or dichloromethane.

Before backbone crosslinking, substantially linear polymers or oligomers are thermally produced from the preferred monomers. The polymers can be crosslinked by any crosslinking initiating means such as by heat, by free radicals, or by wave energy. Thermally backbone crosslinked polymers are prepared from such thermally formed polymers containing perfluorocyclobutane rings by heating the polymers to a temperature sufficient to result in crosslinking, that is for chemical bonds to form between at least some of the polymer molecules. The temperature for such crosslinking is higher than that required for thermal (linear) polymerization, preferably it is at least about 50° C. degrees higher than the temperature required for thermal (linear) polymerization, more preferably from 250° C. to 400° C., most preferably from 280° C. to 380° C., even more preferably from 280° C. to 340° C. These temperatures are suitably maintained for a time sufficient to achieve a preselected degree of crosslinking. Such times are preferably from 1 minute to 10 days, more preferably from 15 minutes to 1 day (24 hours), most preferably from 15 minutes to 8 hours.

In alternative embodiments of the invention, the polymer is formed from monomers having at least one perfluorocyclobutane ring, preferably of the formula:

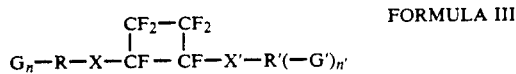

FORMULA III wherein R and R' independently represent optionally inertly substituted groups; X and X' represent molecular structures which link R and R' with the perfluorocyclobutane ring; n and n' are the number of G and G' groups, respectively, and preferably are independently integers of from 1 to about 4, more preferably from 1 to about 2 most preferably 1; and G and G' independently represent any reactive functional groups or any groups convertible into reactive functional groups, preferably any functional group suitable for reaction with di- or poly-functional compounds to form polymers. Alternatively, G and/or G' is a group suitable for chemical conversion into a functional group suitable for reaction to form a polymer.

G and G' are preferably independently selected from the group consisting of reactive functional groups including hydroxyl groups (both alcoholic and phenolic) and esters thereof, carboxylic acid groups, thiocarboxylic acid groups, thiocarboxylic and carboxylic esters, preferably lower alkyl esters of from one to about 12 carbon atoms, such as methyl and ethyl esters, acyl halides such as chlorides, isocyanates, acyl azides, acetyl groups, trihaloacetyl groups, primary or secondary amines, sulfide groups, sulfonic acid groups, sulfonamide groups, ketones, aldehydes, epoxy groups, primary or secondary amides, halo groups (e.g. chloro, bromo, iodo, and fluoro groups), nitro groups, cyano groups, anhydrides, imides, cyanate groups, vinyl, allyl, acetylene groups; silicon-containing substituents such as alkyl silanes, siloxanes, chlorosilanes, phosphorus-containing groups such as phosphines, phosphate, phosphonate, boron-containing groups such as boranes and groups convertible into reactive functional groups including esters; trihalomethyl groups; alkoxy groups, alkyl groups when R is aromatic said alkyl and alkoxy groups preferably containing from about 1 to about 12 carbon atoms: and the like. More preferably, for ease in preparation of the compounds and polymers thereof, G and G' are independently selected from hydroxyl groups and esters thereof, carboxylic or thiocarboxylic acid ester groups, carboxylic acid groups, acyl chlorides, isocyanates, acetylenic groups, alkoxy groups, alkyl groups when R is aromatic, and primary or secondary amines. Most preferably, for ease in preparation of the compounds and polymers thereof, G and G' are the same and are selected from hydroxyl and esters thereof, carboxylic acid ester groups, carboxylic acid groups, acyl chlorides, isocyanates, acetylenic groups, and primary or secondary amines.

Preferred X and X' are independently generally as described for X in Formula I and preferred R and R' are independently: generally as described for R in Formula I.

Such monomers are preferably prepared from monomers of the Formula:

Formula IV wherein R and X are as defined for Formula 1; and G and n are as defined for Formula IV.

Conveniently, the process for preparing such monomers comprises the steps of:

(a) preparing a 2-halotetrafluoro compound of Formula V:

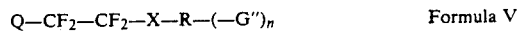

Formula V wherein X, R and n are as previously defined for X, X', R, R' and n in Formula IV: Q is bromine, chlorine or iodine; preferably bromine or iodine, most preferably bromine; and G" is a functional group G, as previously defined, or a functional group suitable for conversion into G or G': and (b) chemically modifying group G" to produce functional group G or G';

(c) dehalogenating the 2-halotetrafluoro compound to form the corresponding trifluorovinyl compound (d) thermally dimerizing the perfluorovinyl compound to form: a perfluorocyclobutane ring.

Step (b) optionally precedes or follows step (c) and/or (d), or steps (b) and (c) are simultaneous, generally depending on the relative ease of the reactions required and the relative sensitivity of the 2-halotetrafluoro group or the trifluorovinyl group to the chemical reactions required for step (b).

Monomers of Formula III are suitably reacted with di- or poly-functional compounds reactive with the groups represented by G and G' to form polymers therewith by means within the skill in the art of polymerization. Preferably, the polymers are condensation polymers such as polyesters, polyamides, polycarbonates, polyethers, epoxy resins and the like.

In the practice of the invention, polymers having perfluorocyclobutane rings are found to adhere directly to materials such as compatible polymers, polymers having a common solvent, metals, particularly textured metals, silicon or silicon dioxide, especially etched silicon or silicon oxides, glass, silicon nitride, aluminum nitride, alumina, gallium arsenide, quartz, ceramics, etc. Alternatively, an additional material or layer may be introduced between a layer having perfluorocyclobutane groups and an adjacent layer to improve adherence; exemplary of such layers or materials are primers, adhesion promoters such as a silane, preferably an organo silane such as trimethoxyvinylsilane, triethoxyvinylsilane, hexamethyldisilazane [$(CH_3)_3$—Si—N-H—$Si(CH_3)_3$], or an aminosilane coupler such as Y-aminopropyltriethoxy silane or a chelate compound such as aluminum monoethylacetoacetatediisopropylate [$((isoC_3H_7O)_2Al(OCOC_2H_5CHCOCH_3)$)] are useful in the practice of the invention. A toluene solution of the chelate is, for instance, spread on a substrate. The substrate is then baked at 350° C. for 30 minutes in oxygen to form a very thin (e.g. about 5 nm) layer of aluminum oxide on the surface. Other means for depositing aluminum oxide are likewise suitable. Polymer is then deposited or otherwise applied. Other adhesion promoters are suitably applied as layers on a substrate or on a layer of polymer having perfluorocyclobutane groups. Alternatively, the promoter is blended with the monomer before polymerization, negating the need for formation of an additional layer. The adhesion promoter may be blended e.g. at from about 0.05 weight percent to about 5 weight percent. In general less than about 0.05 weight percent is ineffective, and more than about 5 weight percent adversely affects other desirable properties of the polymer, such as low dielectric constant or low water absorption. Additional adhesion promoters useful in the practice of the invention include Chemloc speciality elastomer adhesives, fluoroepoxides including fluorodiepoxide adhesives, vinyl tri-tert-butyl silane peroxide, neoalkoxytitanates, neoalkoxyzirconates, iminoxyl radical compounds, polyarylene sulfide resins, aromatic polyether-sulfone resins, aromatic polyether ketone resins; alkoxy containing silicon compounds, organotitanates, organohydrogensilicon compounds, m-aminophenol (optionally in an adhesive blend such as a phenoplast blend), chromic acid, phosphoric acid, polyalkylsilicate containing finely divided metal such as zinc, chromium III complexes of such compounds as fumaric acids, epoxy resin with curing agents such as dianhydrides, ammonium; chromate, ammonium phosphate, chromium/chromium oxide mixtures, carboxyl-containing alpha-olefin polymers, fluorinated acids and alcohols, organic complexes of metals of groups 2B or 8 on the periodic table of the elements, porous layers of fluoropolymer particles, adhesive cements; optionally fluorinated rubber optionally with tackifiers such as urethane, epoxy or acrylic resins; hydrocarbon polymer with halogenating agent, tri-allyl cyanurate, tri-allyl isocyanurate, silicon tack agent, perfluoroalkoxy resin with resin containing imide linkages, polysulfidic silane compounds, epoxy adhesive, alkali and/or alkaline earth alumino-borosilicate glass, bis-chloroalkyl vinyl phosphonate, polyurethane mastic, polyester film bases, polyamide acid salt, metal oxides, fluorine resin promoters optionally containing oxidants and/or inorganic acids, methylmethacrylate copolymers, zinc phosphate, zinc dispersion, water-hardening cements, peroxy organic compounds, fluorine resin containing asbestos paper, lithium polysilicate, powdered acid and alkali-resistant inorganic substance (such as silica, graphite, molybdenum sulfate, or chromium oxide), aluminum borophosphate, alkyl silicates, alkali metal silicates, polyamine-imide primers, polyvinylcinnamic acid (optionally exposed to ultraviolet light), deposited carbon layers and the like. Alternatively, fillers including superfine inert fillers, glass fillers, copper oxide and other metal oxides, colloidal silica, glass fibers, water hardening cements; mineral fibrils such as potassium titanate, titanium dioxide or boehmite; boehmite in other forms, asbestos and the like improve adhesion. Such fillers are optionally coated or treated (e.g. with surfactant or adhesion promoter) to improve adherence to the polymer. Processes involving grafting such monomers; as acrylic esters and/or other vinyl compounds to the polymer (e.g. using catalysts or radiation), and optionally treating the grafted molecules (e.g. saponification), also is suitable to increase adhesion to the polymer.

Adhesion is also coveniently enhanced by surface preparation, texturizing a substrate, for instance, by scratching, etching, plasma treating, buffing and the like. Other means of surface preparation include degreasing, plasma treating, sonic cleaning, solvent treatment, $SO_3$ treatment (especially of silicon oxide), plasma glow discharge (PGD); PGD followed by adhesive monomers; air, oxygen, or ammonia plasma; gas plasma etching; sodium treatment; wet chemical etching; electrochemical reduction; grafting; application and removal of metals such as aluminum; ion and electron beam techniques such as 6 MeV fluorine ions, electrons at intensities of about 50-2000 V, hydrogen cations at about 0.2-500 ev to about 1 MeV, helium cations at about 200 KeV to 1 MeV, fluorine or chlorine ions at about 0.5 MeV; neon at about 280 KeV; oxygen enriched flame treatment; Accelerated Argon Ion treatment; low pressure plasma; irradiation in adhesive monomer vapor (radiation induced grafting); Fastblast Process; depositing carbon layer(s); arc treatment; plasma polymerizing in the presence of materials such as alkyl silanes or stannanes; sodium naphthalemide; roughening and/or oxidizing; treating with organic peroxide or polyamine optionally followed by coating with silicone adhesives or adhesion promoters; rough chromate coating; plasma depositing e.g. a hydrocarbon film; inert gas glow discharge (e.g. argon, helium, neon); low temperature plasma treatment; corona discharge treatment; microwave discharge plasma; irradiating with high energy ions e.g. of at least about 0.1 meV/amu; abrasion optionally followed by a polymer such as polyvinylcinnamic acid which is optionally cured, e.g. by ultraviolet light; reaction of metal oxide with aqueous aldehyde optionally with electrical potential treatment; noble metal activator treatment; treatment with alkali metal (e.g. in organic solvent) and e.g. naphthalene, followed by contact with an oxidative mineral acid or mixture thereof; sand blasting; heat treating in solution of alkali metal hydroxide; treatment with alkali metal or hydroxide thereof and hexamethylphosphotriamide and or aromatic hydrocarbon; and ozone treatment.

In the cases where the polymer having perfluorocyclobutane groups is applied as a coating, the other layer(s) are optionally referred to as a substrate(s).

Polymers having perfluorocyclobutane groups, particularly those formed from monomers having at least three perfluorovinyl groups, have densities approximating those of the monomer: therefore, when the monomer or prepolymer is applied to an object and polymerized thereon there is insufficient dimensional change (shrinking or expansion) to result in internal stress. Because of this property, the polymers are useful as layers in situations where dimensional stability is important, such as a layer between other layers, e.g. an adhesive.

Polymers containing perfluorocyclobutane rings are suitably applied to the other layer(s) by any means. Means for application are within the skill in the art. For instance, layers are suitably placed adjacent to one another, preferably they are contiguous or adhered in some manner such as by use of an inner layer between them. Layers of polymer having perfluorocyclobutane groups are applied by methods such as vapor deposition (chemical or physical), sputtering, solution deposition, liquid-phase epitaxy, screen printing, melt spinning, dip coating, roll coating, spinning, solution casting, brushing (e.g. varnish), spray coating, powder coating, plasma deposition, dispersion spraying, solution casting, vacuum deposition, slurry spraying, dry-powder-spraying, fluidized bed techniques, radio frequency (RF) plasma deposition, welding, explosion methods including the Wire Explosion Spraying Method and explosion bonding, press-bonding with heat; plasma polymerization; dispersion in a dispersion media with subsequent removal of dispersion media; pressure bonding e.g. at softening point of polymer; adhesively joining a pair of surfaces one of which contains a polymerization or crosslinking catalyst or initiator such that polymerization is initiated on contact; heat bonding with pressure e.g. in a reduced pressure gaseous environment; vulcanization; extruding molten polymer onto a surface; hot-gas welding; baking-coating; sintering; placing one layer and the polymer layer (optionally in particulate form) between hot rollers; application in a binder which is optionally subsequently removed e.g. by pyrolysis, and the like. Mono- and multilayer films are also deposited on a substrate using a Langmuir-Blodgett technique, at an air-water or other interface. Spin coating, spray coating, solvent casting, screen printing and casting from solvents are particularly useful. The polymer (monomer or prepolymer) is suitably applied to an object heated sufficiently hot to evaporate a solvent and-/or polymerize the prepolymer or monomer or cure the polymer. For instance, an object such as a hot wire is suitably passed through polymer, prepolymer, or monomer in a liquid state (e.g. molten or in solution), optionally as a spray or other comminuted form, at a rate calculated to result in deposition of a layer of predetermined thickness. Alternatively, other materials such as metals including aluminum, gold, copper, titanium, chromium, iron, tellurium, polymers, silicon, silicon dioxide, and the like are applied to polymers having perfluorocylobutane groups by methods including those listed for applications of the polymers, particularly by sputtering, vapor deposition and other means within the skill in the art for such depositions. Use of such techniques and other suitable coating techniques is within the skill in the art.

Any solvent for the monomer, prepolymer or polymer may suitably be used. Solvents include hydrocarbons such as o-, m- or p-xylene, mesitylene toluene, benzene: chlorinated hydrocarbons such as chlorobenzene, dichloromethane; ketones such as methyl ethyl ketone, isopherone, acetone, methyl isobutyl ketone, and cyclohexanone; esters such as isoamyl acetate, n-butyl acetate, ethyl acetate, cellosolve acetate, methyl cellosolve acetate; ethers such as diglyme, tetrahydrofuran; amides such as N,N-dimethylformamide; and other polar solvents such as nitromethane, or 1-methyl-2-pyrrolidinone; and the like. The range of solvents facilitates smooth coatings in a variety of applications.

The polymer having perfluorocyclobutane groups optionally contains other materials (materials of composition different from that of the polymer, preferably non-polymeric materials) such as additives to change the chemical or physical properties of the polymer, for instance stabilizers, adhesion promoters and the like or, preferably, metal-containing compounds such as magnetic particles, such as barium ferrite (BaFe) iron oxide (e.g. $Fe_2O_3$, optionally with Co), or other metal containing particles for use in magnetic media, optical media, or other recording media; conductive particles such as metal or carbon for use as conductive sealants, conductive adhesives, conductive coatings, electromagnetic interference (EMI)/radio frequency interference (RFI) shielding coating, static dissipation, electrical contacts and the like. In these respects the polymer can conveniently act as a binder resin. Certain materials may be residual in the layers from means for coating the polymers, for instance fillers, thickeners, surfactants and the like may be used in screen printing, spray coating and the like.

Polymers having perfluorocyclobutane groups in their backbones, particularly such solid polymers, preferably those also having aromatic group and noncarbon atoms in their backbones are useful in composites wherein the polymer surrounds, thus forms layers around such materials as fiber glass, particularly fiber glass mats (woven or non-woven), graphite, particularly grapite mat (woven or non-woven), Kevlar TM, Nomex TM, glass spheres and the like. Such composites are especially useful because of properties such as low viscosity, good wetting, and lack of volatile materials formed during polymerization. The polymers offer properties such as toughness, thermal oxidative stability, low dielectric, ignition resistance, flexural and tensile modulus, and environmental protection. Composites can be made from e.g. mats or other layers by means such as use of preforms, dipping mats in monomer or prepolymer, resin transfer molding (where the mat is placed into the mold and monomer or prepolymer is added and heated to polymerize) and the like. While the polymers are particularly useful as exterior layers, dielectric layers and the like, they are also useful as reinforcing or other interior layers such as reinforcements in tires, drive belts and the like. Layers within composites are referred to herein as reinforcing or filling layers.

Polymer having perfluorocyclobutane groups are particularly useful as a coating for glass and other transparent materials because of the polymer's clarity. Coatings for transparent materials are useful for scratch resistance, environmental protection including protection from moisture and chemicals, flexibility, toughness, thermal stability and the like. The coatings are useful on windows, green houses, skylights, oven windows, solar stills, and the like. Additionally, the polymer is useful in anti-fouling coatings on such objects as boats; underwater insulation, particularly electrical insulation; and on vessels, helmets, valves (valve liners), molds, turbine blades and other parts, light bulbs, carpet, tubs (e.g. for washers or driers), electrical switch enclosures, batteries, battery separators; film such as photographic and photovoltaic film; bathtubs and shower coatings, tiles, swimming pool (liners), siding, roofing, UV filter, sleeping bags, sails, raincoats, and the like and in mildew resistant coatings. The flame resistance of the polymers renders them useful in ignition resistant paints and as coatings on protective clothing, sick room equipment, medical and other clothing, bed linens, instruments, mattresses, furniture, draperies, carpet, pillows, toys, tents, campers, fuel containers (liners), building materials, and the like. Because of the range of temperature resistance of the polymers, they are suitably coated on cryogenic containers, autoclaves, ovens, and the like used in retortable pouches, cookware, utensils for coated cookware, heat exchangers and other heated or cooled surfaces Microwave applications include roasting bags, microwave cookware and containers, popcorn bags, boiling bags, frozen food trays, microwavable food containers and the like because of resistance to degradation by heat or microwave radiation. Coatings of the polymer are additionally useful on food processing equipment, refrigerators (inside or outside) and the like.

Applied to layers such as film, electronic components, mirrors, glass, polymers of other composition, metals and alloys thereof, silicon oxides, silicon and the like, the polymer having perfluorocyclobutane groups is useful in components including: non-glare or antireflection coatings (e.g. for photographic film) because of optical clarity and refractive index: reflection coatings for metal or dielectric reflectors because of properties of low dielectric, hydrolytic stability, clarity, or colorlessness; interference filters when applied to other polymers because of properties of optical clarity and low refractive index; polarizers; beam splitters; passive devices such as couplers because of its index of refraction: photon detectors including photoconductive and photoemissive detectors because of properties of optical clarity: photovoltaic devices such as solar cells because of properties of hydrolytic stability, optical clarity: in imaging applications, e.g. in electrophotography including Xerography and Electrofax because of properties of low dielectric and optical clarity: in thin film displays (e.g. electroluminescent and electrochromic) because of properties of planarization and low dielectric; in information storage devices because of properties of planarization, environmental stability; in thin film active components such as transistors and diodes because of properties of low dielectric; dopant diffusion layers in implant masks; in thin film integrated circuits as dielectric interlayers and the like because of low dielectric and ability to planarize; in microwave circuits such as microwave integrated circuits (e.g. as microwave circuit boards) because of properties of low dielectric, low dissipation factor, and in other microwave applications such as telecommunications equipment, including receivers (e.g. antennas and probes) and transmitters (broadcasting and power), particularly as coatings for these, because of resistance to degradation by microwaves, transmission of such waves and lack of absorption in the microwave range: in surface acoustic wave devices such as transducers, delay lines, band-pass filters, pulse-compression filters, amplifiers, guiding components and other applications because of properties of low dielectric, refractive index, optical density; in charge-couple devices as scanners because of properties of planarization and optical clarity; in thermal detectors, thermal imaging devices, photothermal conversion devices because of properties of temperature stability; because of low dielectric properties the polymer is useful as passivation layer in high speed electrical switches; as a non-linear optical (NLO) polymer backbone to produce active device structures for optical interconnects because of properties of low dielectric, high heat stability, and good optical transmission; fiber optic sensors.

Polymers having perfluorocyclobutane groups are useful in seals and gaskets, preferably used as a layer of a seal or gasket, e.g. around a scrim, but alternatively used alone. As a seal or gasket, the polymer offers advantages such as chemical resistance, high thermal stability, oxidative stability, solvent resistance and the like.

Polymers having perfluorocyclobutane rings have properties of resisting transport of chemical species that could attack an underlying layer, such as hydrolytic stability, hydrostatic stability, chemical resistance, low moisture absorption, weatherability, and the like (hereinafter referred to collectively as environmentally protective, meaning protective from at least one substance or force to which an object is exposed in its environment, including conditions of manufacture, storage and use) that result in utility as coatings to impart surface passivation for instance to metals, semiconductors, capacitors, inductors, conductors, solar cells, glass and glass fibers, quartz and quartz fibers, polymers such as polycarbonate and the like to improve corrosion resistance, reduce sensitivity to chemicals, protect from scratches. Because of optical clarity, the polymers are suitable environmentally protective and/or scratch resistant coatings even for devices such as photovoltaics, optical disks, windows, eye glasses, mirrors (especially those used outdoors), optical fibers and the like. The polymers have properties of low coefficient of friction (for instance, less than 0.25 static coefficient and less than 0.16 dynamic coefficient of friction), scratch resistance, high heat resistance, chemical resistance, and colorlessness that result in utility as coatings for tribological applications (interfacing surfaces in relative motion) such as wear-resistant coatings and lubricating coatings. They are also useful in decorative applications such as clear coating for preserving automobile finishes e.g. as an overcoat to paint, as an undercoat to smooth paint or in automotive body panels, building materials, wall papers or other wall coverings, siding, display materials and the like; in fabrication of structural forms as coatings for flame resistance, weather resistance, moisture resistance and such as on thermoplastics, wood, metal, fibers, and powders. Because of low temperature curing, low dielectric, low moisture absorbance, chemical resistance and optical clarity, layer(s) of polymers having perfluorocyclobutane groups or materials having such layers are particularly useful in electronic packaging such as multichip modules, multilayer chips, microwave circuits, planarization layers, optical interconnect lines, circuit boards, cable insulation and the like. The polymers are also useful as environmentally protective layers and impact absorbing layers for micromachines.

Resistance of polymers having perfluorocyclobutane rings to radiation (e.g. electron-beam, gamma-waves and alpha particles) results in their usefulness as layers in objects exposed to radiation, such as instruments: or packaging to be sterilized by radiation, as substrates for films, in electronics exposed to radiation and the like. For instance, the polymers are useful as passivation coatings on medical instruments and in packaging for medical devices such as bandages, operating equipment and the like. Similarly, the polymers are useful in e.g. X-ray films. Because the polymers are both radiation and heat resistant, as well as resistant to chemicals, including oxygen and moisture, their usefulness extends to labware including petri dishes; incubator windows, window coatings and linings: oxygen tents and masks; sterilizable (gamma ray and/or autoclavable) equipment such as trays, surgical drapes, medical table surfaces, medical clothing; surgical packs; body fluid containers; and the like.

The chemical resistance of polymers having perfluorocyclobutane polymers, particularly polymers having perfluorocyclobutane groups, aromatic groups and non-carbon atoms, preferably oxygen or sulfur in the backbones thereof, renders such polymers useful for protection from chemical attack. In addition to passivation, such use includes masking of underlying layers for solder, for etching, for module fabrication graphs device and the like. The polymers are useful as cable jacketting for e.g. optical, electronic, and superconductive wires or fibers.

In electronics applications, varieties of substrates are coated with polymeric materials either for selective etching or for passivation. Typical substrates include silicon, silicon oxides, gallium arsenide or other compounds of metals of Groups IIIA and IVA of the periodic table as basic semiconducting materials for forming: transistors, diodes, and capacitors: silicon dioxide, silicon nitride, or phosporus-doped silicon dioxide as dielectric materials for interlayer insulation and passivation: aluminum or polycrystalline silicon as conducting materials for e.g. contacts, interconnections, and electrodes; chromium or alloys thereof e.g. used in optical masks for photolithography; or copper as conducting material used e.g. in printed circuit boards. Silicon is a major semiconducting material in microelectronic devices. It advantageously begins microfabrication in the shape of wafers. The surface of a silicon wafer or that of a epitaxially grown silicon layer is cleaned for polymer film deposition. A silicon surface is generally coated with an oxide layer, e.g. by thermal oxidation or by chemical vapor deposition, before being coated with a resist. Highly doped polycrystalline silicon is, however, generally coated with resist to be patterned to form electrodes or interconnections in integrated circuits. Such a material (also called polysilicon) is deposited e.g. on an oxide layer from the vapor phase by pyrolyzing silane. Polycrystalline silicon is useful e.g. to form electrodes in capacitors and transistors. To form electrodes, before patterning, the layer is preferably doped e.g. by thermal diffusion or by ion inplantation to increase conductivity.

Typically, surface flatness of a silicon wafer used in a semiconductor device does not deviate from optical flatness more than about 70 μm. Additional deviation is generally caused by oxide layer deposition because of a difference in thermal expansion coefficient between oxide and silicon. Polymers having perfluorocyclobutane groups are suitably used to planarize the wafer, which allows the production of smaller circuitry (higher density). Such polymers can be applied and allowed to adhere during thermal cycling.

Gallium arsenide (GaAs) and its homologues are also frequently used in semiconductor devices such as high-speed transistors, high speed integrated circuits, light-emitting diodes, and laser diodes, and thus is a useful substrate for layer(s) of polymer having perfluorocyclobutane groups. Silicon dioxide, as a common insulator in semiconductor devices, is also a suitable substrate for polymer layers according to the practice of the invention. It is often formed on silicon by thermal oxidation of the surface with oxygen or water vapor at a temperature between 1000° and 1200° C. or is, optionally, chemically deposited onto a substrate, not necessarily silicon, e.g. from the vapor phase, e.g. by the oxidation of silane with oxygen at a temperature between 400° and 500° C. Silicon dioxide is hydrophobic but reacts with water vapor in the atmosphere to form silanol (Si—OH), or a silanolated surface is formed in the chemical vapor deposition of silicon dioxide. Surface treatment to enhance adhesion is preferred before applying a polymer layer. Silicon nitride is conveniently deposited vapor phase from e.g. silane and ammonia at a temperature between 700° and 800° C. Silicon nitride is often a barrier for selective oxidation of silicon surface. Phosphorus-doped silicon dioxide is advantageously deposited vapor phase by the reaction of oxygen with silane and phospine ($PH_3$). It is useful for e.g. interlayer insulation and passivation of devices. A surface treatment is preferred prior to polymer film deposition. Chromium is a useful opaque layer in optical masks conveniently at a thickness of about 0.08 to 0.01 μm, e.g. deposited by vacuum evaporation or sputtering. Copper is widely used as a conductor in electric and electronic industries. In printed circuit boards, a copper foil is conveniently patterned lithographically to form interconnections between electronic components. Polymers having perfluorcyclobutane groups are advantageously deposited on any of these substrates.

The surface onto which a polymer film is applied is preferably clean and free from dust particles to avoid adhesion problems and/or defects in the film. Cleaning of a silicon wafer surface may, for instance, involve: (1) boiling in a solvent, e.g. trichloroethylene, (2) washing in another solvent, e.g. acetone (room temperature), followed by (3) boiling in an acid, e.g. concentrated nitric acid. In a typical process, steps 1 and 2 take about 5 minutes each and step 3 takes about 15 minutes. Other substrate treaments include, for instance, etching silicon dioxide, with aqueous hydrofluoric acid (HF); hexamethyl disilane (HMDS) treatment of polysilicon, silicon dioxide, phosporus doped silicon dioxide or silicon nitride.

Practice of the invention is particularly useful as one or more layers, optionally with layers of different composition, on substrates such as wires, fibers (synthetic and natural), cables, and other elongated objects which can be coated on all exposed surfaces. The polymers are useful as sleeving, cladding, flame resistant coatings and in addition to being applied by coating means already enumerated can be applied, for instance as tape wound around the elongated object(s). High thermal stability with continuous service at about 200° C. or greater being possible, while maintaining excellent electrical and dielectric properties combined with high resistance to chemicals and solvents, and low coefficients of friction and surface energy of polymers having perfluorocyclobutane groups result in utility, for instance, including tape and wire insulations (particularly in high temperature, high frequency applications) capacitor dielectrics, coaxial connectors, coil wrappers, transformers and as a glass fiber laminate for printed circuit boards. As a material having a low index of refraction as measured by refractometer, in addition to its thermal, hydrolytic and chemical stability, flame resistance, easy curability and compatibility with other materials such as other polymers, polymers having perfluorocyclobutane groups are particularly useful in wave guides as coatings (both claddings and buffering) for optical fibers or in multichip modules or passive devices. Because of the low refractive index, hydrolytic stability and heat stability, the polymers are suitable for use in multilayer optical films for band pass filters and interference coatings.

Coatings can be applied, for instance, as colloidal aqueous dispersions by such means as spraying, dipping, flowing or casting and to obtain a, preferably continuous and/or uniform, coating followed by an initial heating is used to remove solvents e.g. at about 100° to 200° C. and then by curing at about 190° to about 300° C. The polymers can also be applied by extrusion, electrostatic spraying and fluidised bed techniques. A particularly preferred embodiment of the invention include layers of polymers having perfluorocyclobutane groups over optical fibers, e.g. glass fibers. Without an effective coating, the fibers deteriorate from exposure to moisture, e.g. $SiO_2$ develops hydroxy groups and there is a large resulting optical loss. Such a coating is typically applied as a prepolymer solution, preferably of sufficient viscosity to spread evenly to form a uniform coating, from which the solvent is removed (some curing optionally occurs) to form a, preferably tackless, coated fiber by rapid heating, e.g. in a plasma (UV, electron beam), infrared (IR) oven or the like this heating is optionally followed by additional heating or other curing to achieve a polymer which is preferably at least about 50 percent cured, more preferably at least about 80 percent cured, most preferably at least about 99 percent cured. The polymer is a suitable outer coating for such optical fibers because of the polymers' flame retardancy, flexibility, heat durability, low moisture uptake and hydrolytic stability. Such outer coatings are applied by means within the skill in the art such as by extrusion.

For high-density integrated circuit applications, multiple interconnections, which preferably consist of alternating metal and dielectric layers, are very important. Such interconnections enhance efficiency of chip utilization and increase design flexibility. Multilevel structures now have feature sizes of 1 μm, and it is projected that future feature sizes will reach the range of 0.5 μm. Metallization of dielectrics makes it possible to obtain highly packed, multilevel interconnectors. Polymers applied according to the practice of the invention, e.g. by spin coating, planarize underlying topography to provide a surface suitable for the next metal deposition. The degree of planarization is determined by the ratio of the step height with the polymer coating to the initial step height of the metal pattern without the coating. For multilevel applications, vias for metal connections have to be formed to make contact between interconnection levels. Subtractive photolithography techniques in which a photoresist is applied on top of a polymer coating are suitable. Then a cured polymer film is etched, e.g. using a photoresist as an etching mask. A middle layer in a trilevel or multilayer resist system is often silicon dioxide. The layer can be deposited e.g. by vacuum evaporation or deposition, but is conveniently deposited by spin coating. Such a coating is called spin-on glass and is tetraethoxysilane dissolved in ethanol, which when deposited and baked, results in a layer of silicon dioxide.

Polymers having perfluorocyclobutane groups, particularly those having perfluorocyclobutane groups in a polymer backbone, which also has non-carbon atoms and aromatic hydrocarbon groups, preferably separating the perfluorocyclobutane groups exhibit dielectric properties suitable for electronic applications such as insulators in multichip packaging (multichip modules), multilayer electronic structures, capacitors, ring oscillators and the like.

Multichip packaging offers the potential for fabricating circuits with increased density and higher performance at lower cost than is presently feasible. Multichip packaging designs reduce the distance between the chips, thus reducing the necessary wire length. Many multichip circuit designs require multiple levels of interconnection due to the wiring density of the design. This wiring density can be achieved with current thin film technology. The interlevel dielectric material determines the maximum density of the circuit through the line impedance and spacing necessary to minimize crosstalk between signal lines. A material with lower dielectric constant allows closer packing of interconnect lines, and thus provides higher density. Higher density and shorter interconnect lengths also permit the circuit to operate at higher speeds. Conveniently, polymerization of monomers containing perfluorovinyl functional groups is a thermal process which does not require catalysis and does not generate any volatile by-products. To cast the material as a thin film on a substrate, it is convenient to prepolymerize the monomer to an intermediate degree of conversion of the functional groups. The prepolymer can be handled either as a melt or in solution, and can be fully cured to the final thermoset after being cast as a film. Prepolymerization, or B-staging, is performed by heating the neat monomers to a temperature between about 100° C. and about 190° C. for from about 1 min. to about 8 hours, depending upon the temperature. The extent of reaction can be determiend from the reduction of the residual heat of reaction measured by differential scanning calorimetry (DSC).

Polymers having perfluorocyclobutane groups exhibit low water absorption (for instance about 0.025 weight percent water uptake by poly1,1,1-tris(4-trifluoroethyloxyphenyl)ethane] and about 0.04 percent by weight water uptake by poly4,4'-bis(trifluorovinyloxy)biphenyl] as measured by ASTM D-570-81) and desorption of the water within about 24 hours. Such low water absorption avoids the increase in dielectric constants associated with water absorption and the resulting degradation of electrical characteristics of structures in which they are used as a dielectric. The chemical resistance of such polymers is also excellent, such that thin films easily withstand typical metal etching processes. These films withstand hours at elevated temperatures in acid and alkaline baths with apparently little effect.

Thermogravimetric Analysis (TGA) measures the weight of a bulk sample as a function of temperature and time. At a 10° C. per minute ramp rate, the onset of weight loss is observed above about 350° C. in air and nitrogen.

Isothermal weight loss is a more representative indication of the ability of any polymer to withstand processing at a given temperature. In both air and nitrogen environments at 350° C., after 1000 minutes in these environments poly[1,1,1-tris(4-trifluoroethenyloxyphenyl)ethane] loses less than about 1.2 weight percent, preferably less than about 1 percent weight in nitrogen and about 6 percent by weight in air. The polymers exhibit stability at temperatures up to 400° C., as observed in annealing of aluminum.

In fabrication of microelectronic devices, relatively thin defect free films, generally 1 μm thick, are advantageously deposited on a supporting inorganic substrate e.g. silicon; or silicon-containing materials such as silicon dioxide, alumina, copper, silicon nitride; aluminum nitride; aluminum, quartz, gallium arsenide and the like. In the practice of the invention, coatings are conveniently prepared from prepolymers reacted to a molecular weight, for instance, of about 1600 Mn (number average), 4900 Mw (weight average), 11300 Mz (high average) preferably greater than about 5000 Mw. These prepolymers are completely miscible with a variety of organic solvents such as xylene, mesitylene, n-butyl acetate and the like. The dissolved prepolymer can be cast onto a substrate by common spin and spray coating techniques. The viscosity of these solutions is important in controlling coating thickness by either deposition technique.

Films of polymers of perfluorovinyl-containing monomers are coated on salt substrates by spray deposition and cured in air at about 250° C. for about 2 hours. This cure period is selected as corresponding to the minimum time for the elimination of the reaction exotherm as measured by DSC. After curing the films are removed by dissolving the substrate in water bath. The resulting films are between 25 $\mu$m and 50 $\mu$m thick. Samples for dielectric spectroscopy are metallized films prepared by sputtering 100 nm of Au (gold) in an Ar (argon) plasma onto both sides of the films. Disks 9.5 mm in diameter are punched out of the metallized films. These disks are used to measure both the dielectric permittivity with an HP 4192 Impedance Analyzer and the dissipation factor with a GenRad 1615-A Capacitance Bridge, both according to manufacturer's directions. Spectroscopy shows a dielectric constant of about 2.45 and dissipation factor of about 0.0005 for poly[1,1,1-tris(4-perfluorovinyloxyphenyl)ethane].

Samples for dielectric breakdown measurements are not metallized, but are placed between a copper plate and a 6.4 mm steel ball as electrodes. The voltage source is a Bertan Model 205A-10R Power supply driven by a ramp generator at 200 V/S (volts/second). Interpretation and meaning of such dielectric measurements is within the skill in the art such as reflected in "Dielectric Materials and Applications" ed. by A. R. von Hippel, The MIT Press, Cambridge, MA, 1966.

To form a sample illustrative of multichip modules, silicon substrates (100 mm diameter) having 1 $\mu$m of thermal oxide are cleaned with an organic solvent. Then they are metalized using 2 micron Al, Cu-1% which is sputtered then patterned and etched using an aluminum etch solution of (50 weight percent water, 42 weight percent phosphoric acid, 5 weight percent acetic acid and 3 weight percent nitric acid) to form ground plane and bond pad areas. Under the given conditions, about 2 $\mu$m of undercut occurs on each of the exposed sides of the Al wiring traces.

After removal of the photoresist, a coupling agent e.g. vinyltriethoxysilane is applied to the substrate surface and is followed by a prepolymer solution. The coupling agent preferably has an end attached to the SiO$_2$ and AlO$_2$ surfaces, and another attached to the polymer. The prepolymer is spin coated under conditions which result in about 5.5 pm final polymer thickness. The low viscosity, high solids content prepolymer solution affords a very high degree of planarization. The polymer is thermally cured to about 95%, such that remaining unreacted perfluorovinyl groups crosslink into the subsequent polymer layer to enhance polymer-to-polymer adhesion.

Vias are etched into the polymer by sputter depositing a 0.3-0.5 $\mu$m copper transfer mask over the surface. The copper mask is defined and etched using a bath solution of the following weight percent of ingredients 89, water; 8, nitric acid: and 3, acetic acid. After the photoresist is stripped, the substrate is subjected to a barrel plasma etcher (LFE 301C) using a 86% 0$_2$, 14% SF$_6$ gas mixture.

The copper mask is subsequently removed by an acid bath 59 weight percent water and 41 weight percent nitric acid. This acid bath mask has less effect on the exposed Al via pads than the weaker bath used to define the via cuts. Next an in-situ Ar back-sputter is used to deposit a layer of metal and the process above is repeated. Each new polymer layer is subjected to a full cure. The Si substrate is adhered to a alumina base with a low temperature cure epoxy. Wire bonds are made between the external Si substrate pads and the thick-film conductors on the alumina package. Hermetically sealing is optional because of the hydrophobic nature of the polymer. The module package is placed on an interface printed wiring board consisting of power supply, monitor, keyboard and external floppy drive interconnects.

The low dielectric, air curability, low moisture absorbance, thermal stability, and planarity of polymers having perfluorocyclobutane groups makes them particularly useful in such applications as dielectrics, especially in multichip modules; protective coatings; planarizing layers; substrates and the like.

Layer(s) of polymers having perfluorocyclobutane groups are optionally patterned such as for photoresists and by such means as wet etching, plasma etching, reactive ion etching (RIE), dry etching, photo laser ablation, which are within the skill in the art as illustrated by *Polymers for Electronic Applications*, Lai, CRC Press (1989) pp. 42-47. Patterning can be accomplished by multilevel techniques in which the pattern is lithographically defined in a resist layer coated on the polymeric dielectric layer and then etched into the bottom layer. A particularly useful technique involves masking the portions of polymer (or prepolymer) not to be removed, removing the unmasked portions of polymer, then curing remaining polymer, e.g. thermally. Methods within the skill in the art such as wet-etching or oxygen plasma techniques such as reactive-ion etching, other plasma etching, reactive ion etching (RIE) wherein substrates are placed between electrodes (usually plate electrodes which sustain a radio frequency (RF) plasma), reactive ion beam etching (RIBE), ion beam etching (IBE) in which a beam of reactive ions (e.g. O+) are beamed onto the substrate, laser ablation and the like are suitable for etching. The polymers can provide a flexible, X-ray transparent substrate for an X-ray absorbant like gold which is patterned onto a polymer film, preferably on a substrate, e.g. a silicon wafer which is optionally removed, e.g. by etching.

Polymers having perfluorocyclobutane groups are particularly useful for forming planar layers, that is layers which are very smooth as indicated by measurements of surface smoothness using a profilemeter commercially available form such companies as Tencor Instruments. A surface may be thought of as having peaks and valleys. A pen follows the surface up and down as it goes across the surface measuring distances up and down. Average roughness (surface roughness) is the average of such distances measured from the center line outward and is referred to as RA. The biggest peak to valley measurement made in a pass over a surface is referred to as RT. Layers of perfluorocyclobutane containing polymers on substrates originally having a surface roughness of 100–150 Å (such as aluminum or polished nickel) preferably have a planarity after coating of less than about 100 Å, more preferably less than about 50 Å.

To achieve such planarity, a coating is advantageously applied such that the polymer can flow to level roughness introduced in applying the polymer or roughness in the substrate or in metals or ceramics processed onto the substrate. Thus, coatings for planarity are preferably applied by means such as spin coating or spray coating in which the surface tension can function to keep the surface of the coating flat. Other coating means which allow planarity to result include spraying and dipping. These methods and spin coating are within the skill in the art, spin coating art being illustrated by such references as Jenekhe, S. A., "Polymer Processing to Thin Films for Microelectronic Applications" in *Polymers for High Technology*, Bowden et al. ed., American Chemical Society 1987, pp. 261–269.

A solution, preferably of prepolymer, is spread onto the substrate which is held on a vacuum spindle. The substrate is then accelerated up to a constant rotating speed, which is advantageously held for a time sufficient to allow preceding to an even thickness, e.g. 30–60 sec. The solution film, thinned by centrifugal force, is dried to form a solid polymer film. The film thickness decreases with increasing time, rapidly approaching a uniform film thickness.

After a polymer film is formed e.g. by a spin-coating process, the film is conveniently baked. The baking evaporates solvent remaining in the film and generally polymerizes the monomer or prepolymer more completely. Baking temperatures are preferably from about 180° C. to about 300° C., more preferably from about 250° C. to about 300° C. Polymers having perfluorocyclobutane groups advantageously have sufficient hardness to allow polishing of a coating to further improve planarity.

Polymers having perfluorocyclobutane rings (preferably polymers having such rings in the backbone along with linking groups, preferably oxygen or sulfur, and aromatic rings) are particularly useful in magnetic media or other information storage media, e.g. tapes or disks, especially hard disks. The planarization properties; thermal, water and chemical stability: mechanical properties such as hardness, flexural and tensile modulus, flexibility, toughness, elongation, and flexural strength; cure temperatures; lack of volatiles or other by-products produced in polymerization or curing; and low coefficient of friction make the polymers useful for any or all of several layers on hard disks. Hard disks are generally made up of a substrate, one or more undercoat layers (often nickel or nickel phosphorus), at least one magnetic coating (often an alloy of cobalt and a nonmagnetic metal like chromium), and at least one overcoat (often carbon, e.g. sputtered or wet-coated). The polymers are useful as undercoat and planarization layer(s) on any substrate suitable for disks such as ceramic, glass, canacite (ceramitized glass), or metal such as aluminum, titanium, magnesium, nickel coated aluminum, nickel, plastic (e.g. polyetherimide), or the like. Used as a planarizing coating, the polymer replaces metals such as nickel now used and ground or polished to the desired smoothness (generating waste nickel). A polymer planarization layer is optionally additionally smoothed as by polishing, e.g. with very fine grit pads such as 8000 grit pads. A planarization layer is preferably from about 20 to about 1000 Argstroms (Å) thick, more preferably from about 50 to about 100 Å. The planarity offered by polymer layers according to the practice of the invention is illustrated by the planarity of an unpolished spin coating of poly[1,1,1-tris(4-trifluoroethenyloxyphenyl)ethane] on an aluminum disk which has a planarity of 40 Å as measured by a profilemeter. The substrate is optionally treated as previously outlined to improve adhesion. The polymer advantageously lends mechanical strength without introducing curvature or roughness so that thin substrates are more suitably used. Independently, the polymers are also useful for intermediate layer(s), including magnetic layer(s), which may contain or have adhered thereto, the media, e.g. particles or a layer, applied e.g. by sputtering, of iron oxide, optionally with cobalt (especially as a deposited layer), barium ferrite, a mixture or alloy of cobalt and e.g. chromium and/or tantalum, hereinafter referred to media containing layer(s). Media containing layer(s) are suitably used on one or more planarization layers of polymer, metal (e.g. nickel) or other material. Alternatively, the media is used in or on the planarization layer to avoid a coating step. The media containing layer is optionally the outermost layer or optionally has overcoat(s). Independently of its use in other layers, the polymer is suitably used in one or more over coating layers which cover the media-containing layer(s) and provide smooth, protective, cushioning, planarizing and/or lubricating coating(s) to protect the media from environmental damage or damage from the reading and/or writing head of a disk assembly. Layers of polymer according to the practice of the invention are also useful as the substrate for the other layers. For use as a substrate, the polymer preferably has a hardness of at least about 4 B as measured by ASTM D-3363.

Optical recording media including polycrystalline tellurium films show rapid degradation in high humidity or oxygen environments. Tellurium, for instance, is oxidized upon exposure to air, but under dry conditions a stable passivating layer is rapidly formed preventing further oxidation. Water destabilises this thin oxide layer, and oxidation of the tellurium metal proceeds until it is all consumed. In the practice of the invention, polymers are applied as a barrier or protecting layer to protect the thin layers of tellurium or other optical media from environmental gases and moisture. In one embodiment an air sandwich structure utilises a substrate on which the tellurium metal is deposited; annular spacers then provide the supports for the top polymer film and leave a cavity immediately above the metal. The polymer is optionally used to overcoat or encapsulate optical structures.

Because of their high dielectric strength, resistance to degradation by heat, oxygen and moisture and many chemicals polymers having perfluorocyclobutane groups are particularly useful as capacitor dielectric (films). To make a metallized film capacitor, for instance, the polymer has a layer of such metals as aluminum or zinc adhered to its surface e.g. by physical (preferably vacuum) deposition. Then the film is e.g. wound and, preferably, a clearing voltage is applied to cause localized breakdown discharges at any weak spots in the dielectric to stop the discharge by causing evaporation of metal around the faults.

Polymers having perfluorocyclobutane groups are also useful in displays such as flat panel displays, especially liquid crystal (LC) displays, because of their clarity, resistance to temperatures experienced in fabrication, low temperature cure, hydrolytic and chemical stability. A circuit for controlling the LC display is advantageously assembled, then a layer of the polymer is applied over the circuit by means analogous to that now used for such polymers as polyimides. Another polymer, e.g. a polyimide, is optionally applied over the perfluorocyclobutane ring-containing polymer, adjacent the liquid crystal material, or the liquid crystal material is used adjacent the perfluorocyclobutane ring-containing polymer. A polymer used adjacent a liquid crystal is preferably buffed or texturized to enhance alignment of liquid crystals. When the polymer having perfluorocyclobutane groups (as a first polymer) is used with another polymer (as a second polymer), the first polymer is advantageously a protective layer to lend e.g. hydrolytic stability, planarization and good mechanical properties to the second polymer. Alternatively, whether or not a perfluorocyclobutane ring-containing polymer is used between the controlling circuit and the liquid crystal, such polymers are useful as outer layers, adjacent the liquid crystal and/or on a different layer which is adjacent the liquid crystal. An electrode, electroconductive grid or other display controlling device is optionally introduced into the polymer or between layers.

Because of their resistance to chemicals and moisture, polymers having perfluorocyclobutane groups in the backbones thereof are suitable as integrated circuit (IC) encapsulants. Encapsulants protect the electronic devices from moisture, mobile ions, ultraviolet and visible irradiation, α particles, and/or hostile environmental conditions. An encapsulant preferably also enhances a fragile IC device, improves its mechanical properties, and increases device reliability. Encapsulants of the invention advantageously have good electrical and mechanical properties; and are resistant to solvents, fluxes, and detergents.

High-density and/or high-speed integrated circuits (ICs) such as VLSIC (very large scale integrated circuit), VHSIC (very high speed integrated circuits), and GaAs ICs require fine-line, multilayer conductor patterns to interconnect large numbers of input/outputs (I/Os) on highly integrated circuits. A package must provide effective removal of heat and environmental protection of the ICs. Layers of polymers having perfluorocyclobutane rings assist in achieving these ends. For instance in high density printed wiring boards (PWBs) with plated Cu conductor and glass-reinforced polymer dielectrics: thick film multilayer interconnects with screen-printed conductor pastes (e.g., Cu, Au) and ceramic/glass dielectrics; multilayer co-fired ceramic with refractory metals (W or Mo) and aluminia dielectric; wafer scale integration using IC metallization processes on silicon substrates; and thin film multilayer (TFML) interconnections using Cu, Au, or Al conductors and polymer dielectrics, specifically polymers having perfluorocylclobutane groups. Substrates suitably include ceramics, metals, or silicon wafers.

Using polymers having perfluorocyclobutane rings in electronic devices as described, particularly in integrated circuits, memory or data storage means, in multichip modules or multi-layer chips, allows more electronic devices to be more compact than would be the case without the polymers. Such compactness is particularly important in computers which can be smaller and/or lighter because of use of the polymers. For instance, the computers can have hard disk drives wherein data can be stored more compactly and/or using less weight because of the use of the polymers.

The polymers are also useful for example as powder coatings in the electronics industry for conformal coatings of electronic components such as resistor networks, capacitors and hybrids. Powder coatings are applied, for instance, by automatic fluidised beds, dipping equipment, and electrostatic spraying. For use as a powder coating, the polymer preferably has a fusing temperature below about the melting point of tin lead solder more preferably below about 150° C., most preferably below about 130° C. Alternatively, monomers having a melting point below about 200° C. preferably within the preferred fusion ranges are applied as a powder and heated to effect polymerization. Other components of a desired coating optionally admixed with the monomers before polymerization such that such components remain in the final polymerized coating. Powder coatings are suitably used as slot liners, forming an integral coating over which windings can be directly laid. They are also used for the encapsulation of end windings of motors e.g. for use in portable drills and other motor-containing equipment. Electrostatic powder coating offers an alternative to solvent-based enamels for insulating magnet wires. Cured powder coatings impart properties such as impact strenth, abrasion resistance, moisture resistance, temperature cycling performance, electrical insulation characteristics and adhesion to a variety of substrate and device types, making them particularly useful in both the electrical and electronics industries.

Polymers having perfluorocyclobutane rings exhibit an unusual phenomenon which makes them particularly useful in a variety of applications and facilitates unusual methods of achieving coatings. The perfluorocyclobutane groups tend to segregate from hydrocarbon and polar portions of the molecules (analogous to the behavior of a surfactant). Thus, when coatings or layers are applied under conditions, such as heat or solution, which allow the polymer to assume its equilibrium conformation, there are layers of fluoropolymer and layers of e.g. hydrocarbon in the case of a polymer having a hydrocarbon portion of the molecule. This segregating behavior has many advantages. For instance, the hydrocarbon portion of the molecule will intermix with or adhere to other substances present, e.g other polymers like polystyrene, polyolefins, polyurethanes, polycarbonates, epoxy resins, polyesters, polyamines, polyimides, and the like, particularly hydrocarbon polymers such as polyolefins and polystyrene. The perfluorocyclobutane portions of the polymer, then, tend to align away from the hydrocarbon portions of the molecule, leaving a fluorocarbon-like coating thereon. Similarly, when the non-fluorocarbon portions of the molecule are functionalized, e.g. with groups such as sulfonyl groups; acid groups including carboxylate groups; hydroxy groups; phosphonyl, phosphoryl, phosphine, or phosphate groups; silane groups such as vinyl or allyl silanes; siloxane groups; amine groups: sulfate, sulfonated, sulfoxide or sulfide groups, such groups are attracted to similar substances or to substances, preferably substrates, with which they are otherwise observed to be compatible. For instance, a perfluorocyclobutane ring-containing polymer having an aromatic portion having e.g. silane or siloxane groups adheres to such substrates as silica or silicon wafers such as are used in semiconductor applications and the like. Similarly, a perfluorocyclobutane ring-containing polymer having an aromatic portion having phosphonyl or phosphoryl groups adheres to such substrates as calcium salts such as bone or ceramics and the like. Such polymers having sulfur-containing functionality such as sulfate, sulfonate, sulfoxide or sulfide groups adhere to iron and iron-containing alloys like steel. The fluorocarbon portions of the molecules are, thus exposed in each of the cases, exhibiting properties of toughness, low dielectric, low dissipation factor, lubricity, flame resistance, lower surface refractive index, lower surface tension, fluid barrier properties, repellence of water, oils, soil and the like; resistance to heat, chemical resistance and other environmental protection. Protection from substances such as oil and water reduces penetration of these and improves dimensional stability of the substrate, rendering the substrate stain resistant. Migration of substances such as plasticizers out of the substrate is reduced. Fluorocarbon character on the exterior of an object also imparts mold-release character. In addition, the coatings are scratch-resistant.

This phenomenon is useful, for instance, coating fibers, fabrics or other layers such as wool, cotton, and artificial fibers such as polyesters, nylon, rayon and the like as well as forming layers on molded and other shaped articles. Portions of polymers containing perfluorocyclobutane rings more like the fiber, fabric or layer tend to adhere to the layer while the perfluorocyclobutane portions of the molecule tend to align outside the fiber, fabric or layer. Such properties as flame retardancy, water repellency and the like are observed in the coated fabric, fiber or layer.

One unusual consequence of the segregating phenomenon is that blends of the polymers having perfluorocyclobutane groups and other polymers result in layered materials. It is observed, for instance, that a blend of polymers having perfluorocyclobutane groups and e.g. polystyrene when shaped under conditions allowing segregation of molecular species appears to result in a layered material having hydrocarbon portions of the perfluorocyclobutane-containing polymer blended with the polystyrene while the perfluorocyclobutane groups form an outside layer. Because of this, e.g. 2 weight percent of poly [4,4'-bis(trifluorovinyloxy)biphenyl] in polystyrene results in resistance to the flame of a cigarette lighter for a period of 15 seconds in ambient air. For instance, fibers or microfibers of blends of the perfluorocyclobutane ring-containing polymers and another polymer, e.g. polystyrene are conveniently formed, e.g. by extrusion. The fibers may be prepared in a continuous or discontinuous manner and optionally into e.g. a non-woven mat which is optionally further fabricated such as by compaction, stretching, calendering, embossing, twisting, winding etc. to further alter or collect the resulting mat. When perfluorocyclobutane ring containing polymers are blended with other polymers it is preferable to select polymers of similar Tg (glass transition temperature) such that both polymers are melted and segregation is facilitated.

While polymers having perfluorocyclobutane groups are generally useful as layers or coatings, the preferred polymers are generally those having linking structures and aromatic portions of the molecule. More preferably the polymers are formed by thermal polymerization of monomers of Formula I, most preferably where X is oxygen or sulfur, preferably oxygen and R is an aromatic group. Among such polymers, both thermoplastic polymers such as polymers of bifunctional monomers such as 4,4'-bis(trifluorovinyloxy)biphenyl; 1,3-bis(trifluorovinyloxy) benzene; 9,9-bis(trifluorovinyloxyphenyl) fluorene; and 1,1-bis(4-trifluorovinyloxyphenyl)-1-phenyl ethane; 4,4'-bis(trifluorovinyloxyphenyl) sulfide; 4,4'-bis(trifluorovinyloxyphenyl)isopropane; 2,6-bis(trifluorovinyoxy)naphthalene; or 2,7-bis(trifluorovinyloxy)naphthalene, preferably those which are crosslinked by additional heat such as polymers of 4,4'-bis(trifluorovinyloxy)biphenyl or 9,9-bis(trifluorovinyloxyphenyl)fluorene and thermoset polymers such as those containing trifunctional monomers, preferably more than about 0.5 percent by weight trifunctional monomers are particularly useful. The thermoplastic monomers are particularly useful in applications such as molded circuit boards, film for tape automated bonding, ignition resistant and water repellent coatings, where properties such as extrudability, melt processibility, tear strength, flame resistance, environmental protectiveness and the like are useful. The polymers which can be crosslinked by additional heat are particularly useful in applications such as films and infrared coatings where properties such as chemical resistance, thermosetting, solvent resistance and the like are useful. The thermoset polymers are particularly useful in applications such as planarization coatings, passivation coatings, and scratch resistance where properties such as solution processibility, hardness, thermosetting, low moisture uptake, low dielectric, passivation and the like are useful. Blends of the thermoset and thermoplastic polymers as illustrated by blends of polymers of 1,1,1-tris(4-trifluorovinyloxyphenyl)ethane; 1,3,5-(2-(4-trifluorovinyloxyphenyl)-2-propyl)benzene and mixtures thereof with polymers of 4,4'-bis(trifluorovinyloxy)biphenyl; 9,9-bis(4-trifluorovinyloxyphenyl) fluorene; 1,3-bis(trifluorovinyloxy)benzene; 2,7-bis(trifluorovinyloxy) naphthalene or mixtures thereof are useful when the high temperature physical (mechanical) properties, chemical resistance of the thermoset polymer is needed but the thermoplastic imparts adhesion, lowered flexural modulus (toughness), flexibility, preferably without loss of superior thermal oxidative stability or dielectric properties.

Some of the properties of perfluorocyclobutanecontaining polymers which render them useful as layers and coatings are listed below for a representative thermoplastic poly4,4'-bis(trifluorovinyloxy)biphenyl], a representative thermoplastic poly[4,4'-bis(trifluorovinyloxy)biphenyl] backbone crosslinked at 280° C. for 1 hour and a representative thermoset polymer (poly[1,1,1-tris(4-trifluoroethenyloxyphenyl)ethane)

| PROPERTY | UNITS | TEST METHOD | THERMOPLASTIC | THERMOPLASTIC CROSSLINKED | THERMOSET (WEIGHT PERCENT PURE) |
|---|---|---|---|---|---|
| tensile strength | psi | ASTM D-882-83 | 5,500* | 7,200* | 9,6000* |
| tensile modulus | psi | ASTM D-882-83 | 200,000 | 255,000 | 253,000 |
| percent elongation | | ASTM D-882-83 | 12 | 4 | 4.1 |
| flexural strength | psi | | 10,800* | 8,700* | |
| flexural modulus | psi | D-790-86 | 234,000 | 315,000 | |

| PROPERTY | UNITS | TEST METHOD | THERMOPLASTIC | THERMOPLASTIC CROSSLINKED | THERMOSET (WEIGHT PERCENT PURE) |
|---|---|---|---|---|---|
| coefficient of linear thermal expansion (CLTE) | ppm/°C. | Thermomechanical Analysis E-831-86 | 85;71 | 30 | 90 |
| Tg | °C. | Dynamic Mechanical Analysis D-4065-82/ Thermomechanical Analysis E-831-86 | 170 | | 286 (97%) >300 (99%) |
| stability in nitrogen at 400° C. | minutes-loss in percent by weight | Isothermal Thermo gravimetric Analysis | | | 500 min −17% loss |
| stability in nitrogen at 350° C. | minutes-loss in percent by weight | Isothermal Thermogravimetric Analysis | | | 1000 min −1% loss |
| stability in air at 350° C. | minutes-loss in percent by weight | Isothermal Thermogravimetric Analysis | | | 1000 min −1% loss |
| Refractive Index ($\eta d$) at 1000 nanometers (nm) | | Refractometer by manufacturer's directions | 1.510 | | 1.495 |
| pencil hardness | | D-3363-74 | | | HB |
| durometer hardness | | D-2240-86 | | | D-83 (85%) |
| Barcol hardness | | D-2583-87 | | | B-34 (85%) |
| static coefficient of friction | | D-1894-87 | | | 0.25 |
| dynamic coefficient of friction | | D-1894-87 | | | 0.16 |
| weight percent water take up in 24 hour soak | percent | D-570-81 | 0.04 | | 0.025 |
| weight percent water take up in boil-infinity | percent | D-570-81 modified boil unitl no further gain in weight | 0.22 | | .14 |
| dielectric at 10 khz (kilohertz) | | ASTM D-1510-87 | 2.41 | 2.59 | 2.45 |
| dissipation at 10 khz | | ASTM D-150-87 | 0.0003 | 0.0006 | 0.0005 |
| flammability | | UL 94 (Underwriters Laboratory) | V0 | V0 | V0 |
| flammability, LOI | percent oxygen | D-2863-87 | 42 | | |

*Sample impure

In no instance is the use of a term like fire retardant, fire retardancy, flame resistance or the like to be interpreted as implying those qualities in any actual fire condition, rather the terms indicate that at least some of the polymers perform relatively better than controls in standardized tests. Numerical flame ratings are not intended to reflect the hazards presented by these or other materials under actual fire conditions.

The following examples are offered to illustrate but not to limit the present invention. In each case, percentages are weight percent unless otherwise indicated. Examples (Ex.) of the present invention are indicated numerically, while comparative samples (C.S.) are not examples of the present invention and are indicated with letters.

Dielectric constant and dissipation factor measurements are conducted according to the procedures of ASTM D150-87. Tensile strength and modulus and percent elongation are measured on an Instron model 1125 according to the procedures of ASTM D-882-83.

Samples of [1,1,1-tris(4-trifluoroethenyloxyphenyl)-ethane] (TVE) and of 4,4'-bis(trifluorovinyloxy) biphenyl prepared as taught in U.S. application Ser. No.07/534,818, filed Jun. 7, 1990 which is incorporated by reference herein are used for the following Examples:

EXAMPLES 1-9

Investigation of the effect of solvents and prepolymerization on the attributes of coatings of poly [1,1,1-tris(4-trifluoroethenyloxyphenyl)ethane]

Various degrees of prepolymerization are achieved using a B-staging apparatus having an outer cylindrical insulated jacket with heat supply, open at one end to receive a vertical tubular reactor and a fluidized bed of aluminum oxide between inner walls of the B-staging apparatus and the tubular reactor. The apparatus is a Tecam model SBL-1 Fluidized Sand Bath commercially available from Techne, Incorporated. A thermocouple is inserted in the fluidized bed to monitor temperature. The tubular reactor is immersed into the fluidized bed to a depth of about ¾ of its height, such that the fluidized bed is approximately 6 inches (15.2 cm) above the top of the TVE. The tubular reactor is equipped with a mechanical stirrer, a vacuum inlet and a nitrogen inlet each with valves. The vacuum inlet is used to remove the oxygen from the TVE monomer before the reactor is immersed into the fluidized bed. The nitrogen inlet allows nitrogen to enter the reactor to purge the reactor during the deoxygenation procedure and to maintain an inert atmosphere during the reaction. Before the reactor is immersed into the fluidized bed, the polymer is deoxygenated. Oxygen is removed from the TVE monomer by subjecting the monomer for 2 hours at room temperature (22° C.) under high vacuum and then for an additional hour at 40° C. under high vacuum. After that time, the reactor is purged twice with nitrogen for a period of 15 minutes each (this means that the vacuum valve is closed and then the nitrogen valve is opened to allow nitrogen to enter the reactor). A nitrogen atmosphere is maintained for 15 minutes before the nitrogen valve is closed and the vacuum valve is opened again. This is done two times to give two 15 minute nitrogen purgings.

In each polymerization, a sample of the weight of the TVE indicated in Table 1 is placed in the tubular reactor and immersed in the fluidized bed which has been preheated to the temperature indicated in the table. The reactor is maintained at the indicated temperature for the time shown in the same: table. In each instance, a glassy solid polymer is obtained.

A Du Pont Instruments model 910 Differential Scanning Calorimeter (DSC) commercially available from DuPont Instruments, Inc. is used to determine reactive groups (relative to TVE monomer) remaining after each prepolymerization reaction. Each prepolymer contains a certain percentage of reactive vinyl groups. The method for obtaining the total energy released and the percentage of reactive groups remaining is as follows: A sample of each prepolymer is placed on a heating element of the DSC instrument and slowly heated from 20° C. to 400° C. at 10° C./min. During the heating process, the reactive vinyl groups react and release energy in the process. A DSC program is used to calculate the total energy released (shown in Table 1) after all of the remaining reactive vinyl groups in the prepolymer sample have completely reacted on the heating element. The percentage of reactive vinyl groups remaining is calculated according to the formula:

$$\frac{\text{Total energy released by Prepolymer}}{\text{Total energy released by } TVE \text{ Monomer}} = \frac{265.40}{432.05} = 61.43\%$$

TABLE 1

The sample calculation above is for Sample No. 1 from Table 1.

| Sample or Example Number | Amount (g) of TVE | Various B-Staging Conditions | Conditions for Total Energy[a] Released (Joul/g) | The TVE Percent Remaining Reactive Groups (%) |
|---|---|---|---|---|
| A | all | Monomer, unheated | 432.05 | 00.00 |
| 1 | 30 | 140° C., 3 hrs | 265.40 | 61.43 |
| 2 | 30 | 150° C., 1 hrs | 321.10 | 74.32 |
| 3 | 30 | 150° C., 2 hrs | 277.00 | 64.11 |
| 4 | 30 | 150° C., 3 hrs, R-1[b] | 246.10 | 56.96 |
| 5 | 80 | 150° C., 3 hrs, R-2[b] | 220.25 | 50.98 |
| 6 | 80 | 150° C., 3 hrs, R-3[b] | 223.30 | 51.68 |
| 7 | 80 | 150° C., 3 hrs, R-4[b] | 224.30 | 51.92 |
| 8 | 80 | 150° C., 3 hrs, R-5[b] | 230.50 | 53.35 |
| 9 | 30 | 160° C., 30 min | 325.65 | 75.34 |

TABLE 1-continued

The sample calculation above is for Sample No. 1 from Table 1.

| Sample or Example Number | Amount (g) of TVE | Various B-Staging Conditions | Conditions for Total Energy[a] Released (Joul/g) | The TVE Percent Remaining Reactive Groups (%) |
|---|---|---|---|---|

[a]Each value is an average of two DSC runs wherein all available perfluorovinyl groups are reacted.
[b]Run number Yellowing of the prepolymer is observed when the oxygen is not completely removed from the TVE monomer, but the yellowing does not appear to affect coating quality. The prepolymer is colorless when deoxygenation is complete.

Molecular weight distributions for the indicated prepolymers are determined using a Waters model M-6000 Size Exclusion Chromatograph (commercially available from Waters, Inc.) according to manufacturer's directions. Results are shown in Tables 2 and 3.

Mn is the number average molecular weight. Mw is the weight average molecular weight. Mz is the high average molecular weight.

TABLE 2

Molecular Weight Distribution[a] For B-Staged TVE

| Ex. | B-Staged Conditions | Mn | Mw | Mz | Mw/Mn |
|---|---|---|---|---|---|
| 1 | 140° C., 3 hrs | 1200 | 2500 | 4800 | 2.11 |
| 2 | 150° C., 1 hrs | 880 | 1400 | 2400 | 1.62 |
| 3 | 150° C., 2 hrs | 1300 | 2900 | 6000 | 2.30 |
| 4 | 150° C., 3 hrs, R-1 | 1600 | 4900 | 11300 | 3.00 |
| 5 | 150° C., 3 hrs, R-2 | 2100 | 9800 | 29600 | 4.73 |
| 6 | 150° C., 3 hrs, R-3 | 2000 | 8400 | 23700 | 4.18 |
| 7 | 150° C., 3 hrs, R-4 | 2000 | 9300 | 27500 | 4.53 |
| 8 | 150° C., 3 hrs, R-5 | 1900 | 6900 | 18200 | 3.65 |
| 9 | 160° C., 30 min | 900 | 1500 | 2600 | 1.67 |

[a]as obtained by Size Exclusion Chromatography

TABLE 3

Weight Percent of Each Oligomer[a] Present in B-Staged TVE

| Ex. | B-Staged Conditions | Monomer (%) | Dimer (%) | Trimer (%) | High Molecular weight (%) |
|---|---|---|---|---|---|
| 1 | 140° C., 3 hrs | 25.8 | 20.3 | 14.7 | 39.3 |
| 2 | 150° C., 1 hrs | 40.8 | 27.5 | 15.6 | 16.1 |
| 3 | 150° C., 2 hrs | 23.3 | 19.7 | 15.1 | 41.8 |
| 4 | 150° C., 3 hrs, R-1 | 16.9 | 15.2 | 12.5 | 55.4 |
| 5 | 150° C., 3 hrs, R-2 | 13.64 | 11.79 | 9.57 | Na |
| 6 | 150° C., 3 hrs, R-3 | 14.20 | 12.51 | 10.03 | Na |
| 7 | 150° C., 3 hrs, R-4 | 14.03 | 12.17 | 9.87 | Na |
| 8 | 150° C., 3 hrs, R-5 | 15.36 | 13.77 | 11.09 | Na |
| 9 | 160° C., 30 min | 39.1 | 27.2 | 15.8 | 17.9 |

[a]as obtained by Size Exclusion Chromatography
Na. = not measured

To test the prepolymers in coatings, clean solutions of the indicated preppolymerized polymers are made in the indicated solvents at weight ratios of polymer to solvent of 70/30 percent, 60/40 percent and 50/50 percent. Diglyme, mesitylene, o-xylene and n-butyl acetate are selected for investigation because they represent a wide range of types of solvents, having different points, viscosities and polarities, are solvents for both the monomer and polymer and are known to be useful in coating processes. Each solution is tested using a Solitec model 5110 (horizontal) Spin Coater, commerically available from Solitec, Inc. For each coating, a silicon oxide wafer substrate is centered onto a flat chuck, which is connected to a rotating spindle during spin coating, and 0.25 ml of a solution of triethoxysilyl-benzocyclobutene (TES-BCR) in the test solvent adhesion promoter is dropped onto the surface of the substrate from a syringe equipped with a 1 micron Gelman Acrodisc filter (commercially available from Gelman Science Company). The filter housing is made of polypropylene, and the filter is made of polytetrafluoroethylene and is 25 mm in diameter having inlet and outlet connections on the filter housing. The adhesion promoter is spread over the wafer at a spin speed indicated in the Tables. A sample of 12 mL polymer solution is applied over the surface of the substrate using one of two methods:

For the examples in Tables 4 and Examples 6 and 7, the polymer is applied onto the surface of the wafer using a 10 mL syringe equipped with a filter (Method 1). For Examples 5 and 8, the polymer solution is prefiltered through a filter into a 100 g clean bottle; then the polymer solution is poured from the bottle over the surface of the silicon oxide substrate until the polymer solution covers approximately ¾ of the entire surface of the substrate. (Method 2) For all examples: for polymer coatings of 1.0 micron or less, a 0.20 micron filter is used: for polymer coatings thicker than 1 micron but less than 5 microns, a 1.0 microfilter is used; for polymer coatings thicker than 5 microns, a 5 micron filter is used. The filters are used to remove particles, which would degrade the coating quality.

Then the spin coater is turned on which causes the substrate to go into a spread mode followed a spin mode. The polymer is spread over the surface of the substrate at a spread speed, spread time, spin speed, and spin time as indicated in the Tables to give a uniform spin coated polymer solution.

Each coating is applied to a silicon wafer (substrate) 2 inches (5.08cm) in diameter. The silicon oxide substrates are commercially available from Unisil Corporation, where the substrates are preheated and silicon oxide is deposited on the surface of the substrate. Each wafer is cleaned before spin coating using a LFE Plasma Systems model 301C Barrel Etcher (commercially available from, LFE Plasma Systems, A Mark IV Company) according to manufacturer's directions. The Spin Coater is run according to manufacturer's directions under the conditions indicated in the tables. After being coated, each wafer is removed from the spin coater and placed in a Blue M model B-2730 Curing Oven (commercially available from Blue M, a Division of General Signal) having a programmable temperature control, and being fitted with a filtered nitrogen inlet and outlet such that a nitrogen atmosphere is maintained during curing with a flow of about 100 standard cubic feet per hour (2.8 cubic meters/hour). The nitrogen is filtered using an HEPA 1 micron filter. The prepolymer is further cured at 50° C. for 5 minutes, then the temperature is raised to 100° C. over a period of 15 minutes and maintained at 100° C. for an additional 15 minutes, after which, the temperature is raised to 150° C. over a period of 15 minutes and maintained for a period of 60 minutes, after which the temperature is raised to 250° C. over a period of 60 minutes and maintained for a period of 1 minute, after which the oven temperature is lowered to 20° C. and maintained until the coated wafer cools to that temperature.

After the curing, the film thickness is measured using a Nanospec/AFT Model 210 ellipsometer commercially available from Nanometrics, Inc. and a Tencor Instruments model Alpha-Step 200 profilemeter commercially available from Tencor Instruments, Inc.

Tables 4–5 indicate the results of the coating processes.

TABLE 4

Film Thicknesses ($\mu$m) of Different B-staged Runs from a 50/50% Solid solution in Four Different Solvents at Various Spin Speeds

| Solvent | Spin Speed (rpm) | 140° C. 3 hr (Ex. 1) | 150° C. 1 hr (Ex. 2) | 150° C. 2 hr (Ex. 3) | 150° C. 3 hr R-1 (Ex. 4) |
|---|---|---|---|---|---|
| Diglyme | 5000 | 0.9430 | 0.5906 | 1.0365 | 1.2080 |
|  | 1500 | 1.5586 | 1.1025 | 1.8296 | Na |
| Mesitylene | 5000 | 1.0636 | 0.6728 | 1.1272 | 1.4340 |
|  | 1500 | 1.8494 | 1.2148 | 2.1330 | Na |
| o-Xylene | 5000 | 1.3412 | 0.9863 | 1.5535 | 1.9180 |
|  | 1500 | 2.4900 | 1.8301 | 2.9712 | Na |
| n-Butyl Acetate | 5000 | 1.4511 | 1.0962 | 1.7187 | 1.972 |
|  | 1500 | 2.6505 | 1.9413 | 3.3026 | Na |

For each spin coating, the spin time is 30 seconds and the spread speed and spread time are 500 rpm and 3.0 seconds, respectively. Film Thicknesses are measured with the Nanospec/AFT. Na = Not available
Method 1 is used for spin coating the prepolymer onto the substrate 1-micron fillers are used for each experiment.

TABLE 5

Film Thicknesses ($\mu$m) of Different B-staged Runs from Different Percent Solid solutions in Four Different Solvents at Various Spin Speeds

| Solvent | Spin Speed (rpm) | 150° C. 3 hr 70/30 R-2 (Ex. 5) | 150° C. 3 hr 50/50 R-2 (Ex. 6) | 150° C. 3 hr 50/50 R-3 (Ex. 7) | 150° C. 3 hr 60/40 R-4 (Ex. 8) |
|---|---|---|---|---|---|
| Diglyme | 9000 | 5.75 | 1.2276 | Na | 2.3342 |
|  | 5000 | 7.70 | 1.5877 | Na | 3.1834 |
|  | 1500 | 22.22 | 3.0438 | Na | 6.82 |
| Mesitylene | 9000 | 7.32 | 1.4573 | 1.3193 | 3.20 |
|  | 5000 | 10.30 | 1.9121 | 1.7732 | 4.25 |
|  | 1500 | 24.53 | 3.5342 | 3.2864 | 8.31 |
| o-Xylene | 9000 | 7.75 | 1.8872 | Na | 3.95 |
|  | 5000 | 10.71 | 2.4954 | Na | 5.27 |
|  | 1500 | 22.22 | 4.5146 | Na | 9.98 |
| n-Butyl Acetate | 9000 | 7.71 | 1.9907 | Na | 4.08 |
|  | 5000 | 10.73 | 2.5625 | Na | 5.38 |
|  | 1500 | 20.42 | 4.1041 | Na | 10.20 |

For each spin coating, the spin time is 30 seconds and the spread speed and spread time are 500 rpm and 3.0 seconds, respectively. Na = Not available
For experiments 6 and 7, spin coating Method 1 is used.
For experiments 5 and 8, spin coating Method 2 is used.
A 5 micron filter is used for experiment 5 while a 1 micron filler is used for experiments 6–8.

TABLE 6

Film Thicknesses ($\mu$m) of Different B-staged Runs from Different Percent Solid solutions in Four Different Solvents at Various Spin Speeds

| Solvent | Spin Speed (rpm) | 150° C. 3 hr 50/50 R-4 (Ex. 9) | 150° C. 3 hr 40/60 R-4 (Ex. 10) | 150° C. 3 hr 50/50 R-5 (Ex. 11) |
|---|---|---|---|---|
| Diglyme | 9000 | 1.2529 | 0.6526 | Na |
|  | 5000 | 1.5654 | 0.8701 | 1.3791 |
|  | 1500 | 3.0003 | 1.5175 | Na |
| Mesitylene | 9000 | 1.3877 | 0.8751 | Na |
|  | 5000 | 1.8712 | 1.1225 | 1.6195 |
|  | 1500 | 3.5043 | 2.0482 | Na |

TABLE 6-continued

Film Thicknesses (μm) of Different B-staged Runs from Different Percent Solid solutions in Four Different Solvents at Various Spin Speeds

| Solvent | Spin Speed (rpm) | 150° C. 3 hr 50/50 R-4 (Ex. 9) | 150° C. 3 hr 40/60 R-4 (Ex. 10) | 150° C. 3 hr 50/50 R-5 (Ex. 11) |
|---|---|---|---|---|
| o-Xylene | 9000 | 1.8473 | 1.0619 | Na |
|  | 5000 | 2.4501 | 1.2748 | 2.1485 |
|  | 1500 | 4.77 | 2.3979 | Na |
| n-Butyl Acetate | 9000 | 2.0166 | 1.1234 | Na |
|  | 5000 | 2.6075 | 1.4257 | 2.3616 |
|  | 1500 | 4.99 | 2.6439 | Na |

For each spin coating, the spin time is 30 seconds and the spread speed and spread time are 500 rpm and 3.0 seconds, respectively. Na = Not available

TABLE 7

Film Thickness (μm) For B-staged Run #5 From a 50/50% Solid Solution in Four Different Solvents at Various Spread Times

| | Film Thickness (μm) | | |
|---|---|---|---|
| Solvent Used | 3 sec. | 45 sec. | 90 sec. |
| Mesitylene | 1.6195 | 2.8043 | 5.63 |
| O-Xylene | 2.1485 | 7.15 | 7.61 |
| Diglyme | 1.3816 | 1.8746 | 3.3102 |
| N-Butyl Acetate | 2.3616 | 8.39 | 8.34 |

For each spin coating, the spread speed is 500 rpm and the spin speed and spin time are 5000 rpm and 30 seconds, respectively.

Data in Tables 4–7 show that the degree of B-staging of polymers of TVE is an important variable affecting the film thickness and coating quality. Coating quality is determined from observed uniformity, including absence of holes; a standard deviation of less than about 0.1 among 5 thickness measurements on different portions of a disk is considered good quality. There are also few color patterns of the type produced by thickness variations and no visible bumpiness. At a given reaction temperature of 150° C., when the B-staged prepolymer is dissolved in a given solvent at a given concentration, the prepolymer that has reacted longer gives thicker coatings. These results directly correlate with the results from size exclusion chromatography which show a progressive increase in the concentration of high molecular weight oligomers as the B-staging reaction time for forming the prepolymer increases. The converse is true for the percentage of TVE monomer remaining after each prepolymerization reaction. Furthermore, it is believed that thicker coatings are observed because the viscosity of the prepolymer solution is directly proportional to the percentage of high molecular weight oligomers in the prepolymer. There is also a correlation of B-staging condition with observed coating quality. The better quality coatings are achieved from prepolymers which are polymerized at the longer reaction times (3 hrs at 150° C.). Prepolymers that polymerize at 10° C. higher or lower than 150° C., regardless of the reaction time, generally give lower quality coatings. The prepolymer containing 50.98% unreacted trifluorovinyether groups (Ex. 5) is observed to give the best quality coatings for film thicknesses between 1 and 4 microns.

Two other important variables affecting the film thickness and coating quality are the choice of solvent and prepolymer concentration. The order in which film thickness is observed to increase with solvent is: n-butyl acetate greater than o-xylene greater than mesitylene greater than diglyme. This order is directly proportional to the boiling point of the solvent. Prepolymer solutions of n-butyl acetate and o-xylene are believed to give thicker coatings because the solvent evaporates from the substrate more quickly. As the solvent evaporates, the viscosity of the prepolymer solution on the substrate increases; less prepolymer solution is spun off at higher viscosities: therefore, coatings are thicker. When solutions of prepolymer in solvents with approximately the same boiling point (such as mesitylene and diglyme) are spin coated, the solution containing the solvent with the higher solvent viscosity generally develops thicker coatings. Variations in film thickness from prepolymer solutions of different concentrations indicate that as the prepolymer concentration increases from 40 to 70 percent by weight, the film thickness also increases.

Choice of solvent and the prepolymer concentration also affect the coating quality. Prepolymer solutions in all of the solvents studied are observed to produce good quality coatings, with somewhat less quality observed for coatings from solutions in diglyme. Prepolymer solutions of mesitylene tend to exhibit highest quality coatings between 40 and 70 percent by weight prepolymer for a wide range of film thicknesses (1–25 microns). Highest coating quality is observed for prepolymer concentrations of between 50 and 60 percent by weight.

Results indicate that film thickness increases as spin speed decreases. For low spin speeds of 1500 rpm and for high concentrations of 70 percent by weight prepolymer, the order in thickness does not correlate with the boiling point of the solvent. It is believed that the solution viscosities are sufficiently high to overcome the effect of solvent boiling points on film thickness. The order of film thickness observed for o-xylene and n-butyl acetate at a spin speed of 1500 rpm, is believed to be a result of experimental error in the concentration of prepolymer in n-butyl acetate. Furthermore, coatings from prepolymer solutions in n-butyl acetate and diglyme at concentrations greater than 60 percent by weight prepolymer and for spin speeds of 1500 rpm are observed to be of generally lower quality than those of other coatings from these solvents. Film thickness increases with longer spread times for prepolymer solutions in mesitylene and diglyme. At spread times longer than 45 seconds, the increase in film thickness is not as large for prepolymer solutions of the lower boiling solvents as for solutions in higher boiling solvents. Shorter spread times generally result in better quality coatings.

The differences in thickness between R-2 and R-3 is believed to be a result of differing molecular weight distributions of R-2 and R-3.

EXAMPLE 10

Planarity of a film of poly(TVE)

An aluminum disk having a surface roughness of 100–150 Å as measured by a profilemeter commercially available from Tencor, Inc. used according to the manufacturer's directions is coated with poly[1,1,1-tris(4-trifluoroethenyloxyphenyl)ethane] according to the procedures used in Example 8 with mesitylene as solvent, at a 60 percent by weight concentration of prepolymer in solvent, and the cure of Examples 1–9.

The planarity of the resulting coated disk is measured using the profilemeter as for the disk and found to be 20–40 Å. This measurement indicates that polymers having perfluorocyclobutane groups are useful as coatings to achieve planarization.

EXAMPLE 11

Planarity of a film of
poly[1,1,1-tris(4-trifluoroethenyloxyphenyl)ethane]
over an aluminum conductor Aluminum (Al) containing 1 weight percent copper (Cu) conductor lines are deposited on a silicon oxide substrate using standard techniques used in microelectronics using the steps of:

(A) Cleaning the wafers in an oxygen plasma for 15 minutes using a LFE 301C Barrel Plasma Etcher (commercially available from LFE Plasma Systems) at a gas flow of 130 sccm oxygen, 260 watts, at 1 torr.

(B) Rinsing with ultra pure deionized water and spinning dry then 3 rinses in ultra pure deionized water and another spinning dry.

(C) Depositing an approximately 2 μm metal layer of aluminum containing 1 weight percent copper as an alloy by sputter depositon with an ion gun in an argon atmosphere using a Leybold 560 Box Coater (commercially available from Leybold-Heraeus Technologies, Inc.) having a DC (direct current) magnetron using 10 standard cubic centimeters (sccm) of argon, at a pressure of $5 \times 10^{-4}$ mbars, a 500 V potential, 40 μmA current, for a 1 minute duration to clean the surface and promote metal adhesion followed by a sputter process at 299 sccm argon, at a pressure of $2 \times 10^{-3}$ mbar, an alloy of aluminum with 1 pecent by weight copper as metal source and 1500 watts for 60 minutes.

(D) Washing in a mixture of acetone and methanol, quickly dumping the rinse to remove particulates, and drying at 100° C.

(E) Spin coating with a 4 μm layer of Shipley Microposit S1400-37 Positive Photoresist (commercially available from Shipley Company, Inc.) for 2 sec. at 500 rpm with dynamic dispense, then spinning for 30 sec. at 2500 rpm to form a resist layer.

(F) Baking the coating 30 minutes at 100° C.

(G) Exposing the resist layer to determine the pattern of aluminum using a Canon PLA-501FA aligner (commercially available from Canon USA, Inc.) using proximity mode and a high pressure mercury lamp with an exposure of 47.2 mJ/cm2 over aluminum measured at 405 nm.

(H) Developing the resist layer using Shipley Microposit 454 Developer (2 percent potassium hydroxide) (commercially available from Shipley Company, Inc.) by immersion at 18° C. for 90 sec.

(I) Flood exposing the resist layer using a Canon PLA-501FA aligner (commercially available from Canon USA, Inc.) using a high pressure mercury lamp with an exposure of 236 mJ/cm2 measured at 405 nm.

(J) Baking for 30 minutes in air at 120° C. such that the resist layer withstands metal etching.

(K) Wet etching the aluminum layer at 45° C. for a period of 13.5 min. in a slightly agitated bath of phosphoric acid, 41.8 weight percent in 50.1 percent water with 5.2 percent acetic acid and 2.9 percent nitric acid.

(L) Rinsing in ultra pure deionized water and drying.

(M) Stripping the resist by washing in acetone and mentanol.

(N) Oxygen plasma cleaning the resulting laminate for 15 minutes.

(O) Rinsing by dipping in ultrapure deionized water three times.

(P) Drying by spinning.

(Q) Dehydration baking at 200° C. for a period of 30 minutes.

Equipment used is that described in Examples 1-10 unless stated otherwise.

The lines have a height of 1.7 microns (μm) above the silicon oxide surface as measured using a profilemeter, as in Example 10. A 4 μm thick layer of poly[1,1,1-tris(4-trifluoroethenyloxyphenyl)ethane] is coated and cured over the silicon oxide and Al lines, using the procedure of Example 6 and mesitylene as a solvent at 60 percent by weight concentration of prepolymer in solvent, and the curing procedure of Examples 1-9. The final cured film is observed to cover the surface such that the Al line protrudes above the planarity of the surface by 0.047 μm as measured using the profilemeter. This corresponds to a degree of planarization (DOP) of 97%, and demonstrates the ability of the polymers to planarize large differences in topology as is important for microelectronic applications such as multichip modules.

EXAMPLE 12

Composite of
poly1,1,1-tris(4-trifluoroethenyloxyphenyl)ethane] and glass fiber mat Two plies of woven E glass (electrical glass) mat are cut (4"×5") (9×12.7 cm) and saturated with poly[1,1,1-tris(4-trifluoroethenyloxyphenyl)ethane] monomer. The cloth is placed in: a 5 mil mold with Kapton TM polyimide film commercially available from DuPont de Nemours as release layers. The mold is sandwiched between two 6"×6" (15.2×15.2 cm) aluminum ⅛" (0.32 cm) plates and pressurized to 15 tons gauge pressure (10,000 KPa) in a hydraulic press commercially available from Pasadena Hydraulics Inc. preheated to 180° C. and maintained at that temperature for 1 hour. The temperature of the press is then increased to 240° C. and held at that temperature for 1 hour. The composite is cooled to room temperature under pressure, unmolded, and trimmed. The resulting composite is solid, light amber in color and flexible, with no visible voids.

EXAMPLE 13

Composite of prepolymerized
poly[1,1,1-tris(4-trifluoroethenyloxyphenyl)ethane] and glass mat.

The process of Example 12 is repeated using powdered poly[1,1,1-tris(4-trifluoroethenyloxyphenyl)ethane] oligomers (heated for 1 hour at 160° C., cooled, and ground to a powder) and heating the mold and plates preheated to 240° C. at 10,000 KPa for 1 hour (omitting the 180° C. heating of Example 12). The resulting composite is cooled to about 150° C. and removed from the press. The resulting composite is solid, slightly yellow in color, flexible, and has no visible voids.

EXAMPLES 14-15

Polystyrene microfibers having a coating of
poly[4,4'-bis(trifluorovinyloxy)biphenyl]

Microfibers are prepared from a polystyrene resin commercially available from The Dow Chemical Company under the trade designation Styron 685D (Example 14) and from syndiotactic polystyrene (Example 15), each containing 2 weight percent poly4,4'-bis(trifluorovinyloxy)biphenyl]. A homogeneous melt blend results. A microfiber or a nonwoven mat of microfibers is prepared by introducing an aromatic polymer resin in the form of powder or pellet into a hopper connected to an extruder. The resin is melted in the extruder and supplied to a spinpack, through a molten polymer supplying line by a pump. The term "spinpack" refers to an assembly comprising a die nozzle having an orifice for a molten polymer and having a gas slot for melt-blowing the molten polymer, and a heater for keeping the die nozzle at a prescribed, uniform, temperature of 220° C. The extruder, the spinpack, and the molten polymer supply line also have a heater for melting a polymer or for keeping a polymer in a molten state.

A gas stream of hot air is introduced into the spinpack through a gas stream supplying line. In the spinpack, the molten polymer is forced out of an orifice of a nozzle of the spinpack into the co-current gas stream which attenuates the resin into fibers.

The fibers are collected in the form of a nonwoven mat. The molten polymer is forced out of an orifice of nozzle (die opening) and into the gas stream which is passed through gas slot. Conditions of the preparation are given in Table 10.

TABLE 10

| Example Number | gas stream temperature (°C.) | polymer temperature at nozzle (°C.) | polymer flow rate at nozzle (g/min) | nominal gas flow rate at nozzle (m/sec) | weight percent polystyrene | weight percent syndiotactic polystyrene |
|---|---|---|---|---|---|---|
| 14 | 463 | 307 | 0.246 | 598 | 98 | 0 |
| 15 | 462 | 307 | 0.294 | 597 | 0 | 98 |

The microfibers form a non-woven mass of fiber analogous to a cotton ball. A cigarette lighter is held to each mass for a period of 15 seconds. Neither of Examples 14 or 15 ignite, although some charring is observed No dripping or burning is, however, observed. For comparison, non-woven masses of the polystyrene and syndiotactic polystyrene are formed without the poly[4,4'-bis(trifluorovinyloxy)biphenyl] and are found to ignite readily.

The limiting oxygen index (LOI) of poly[4,4'-bis(trifluorovinyloxy)biphenyl] is determined by the procedures of ASTM D-2863-87 to be 0.419 which is interpreted to mean that the volume percent oxygen required to sustain combustion of the poly4,4'-bis(trifluorovinyloxy)biphenyl] in an oxygen/nitrogen atmosphere is 41.9. NOTE: THESE NUMERICAL FLAME RATINGS ARE NOT INTENDED TO REFLECT HAZARDS PRESENTED BY THESE OR ANY OTHER MATERIALS UNDER ACTUAL FIRE CONDITIONS.

What is claimed is:

1. An electronic device comprising a laminate of having at least two layers at least one of which hereinafter referred to as the first or polymer layer, comprises a polymer having more than one perfluorocyclobutane group, a backbone comprising perfluorocyclobutane groups, linking structures and hydrocarbon containing groups; and is formed from at least one monomer having a structure represented by Formula I or II:

$$CF_2=CF-X-R-(X-CF=CF_2)_m \quad \text{Formula I}$$

or

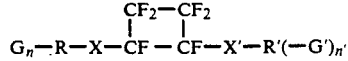

Formula III wherein R represents an unsubstituted or inertly substituted group; each X is independently a bond or any group which links R and a perfluorovinyl group; m+1 is the number of $-X-CF=CF_2$ units; n and n' are the number of G and G' groups, respectively; and G and G' independently represent any reactive functional groups or any groups convertible into reactive functional groups and at least one outer layer, hereinafter referred to as the second layer, having a composition different from the first layer comprising silicon, silicon oxide, barium ferrite, a metal, a semiconductor, a polymer of different composition, ceramic, glass, paper, quartz or mixtures thereof.

2. The electronic device of claim 1, which device is a hard disk drive, an optical disk, an integrated circuit, a capacitor, a multichip module, a wave guide, a liquid crystal display, magnetic tape, magnetic disk, optical recording device, optical or magnetic reading or writing head, ring oscillator, optical filter, photo-voltaic device, thin film display, transducer, circuit board, microwave integrated circuit, microwave transmitter, microwave receiver, amplifier, charge-couple device, optical interconnect, optic sensor, solar cell, or combination thereof.

3. The electronic device of claim 1 wherein the polymer is an insulator in the device.

4. The electronic device of claim 1 wherein R is an unsubstituted or inertly substituted aromatic hydrocarbyl group; each X has at least one non-carbon atom selected from oxygen, sulfur, selenium, tellurium, silicon, boron, phosphorus and nitrogen between the perfluorovinyl group and R, X is attached to an aromatic carbon atom of R; m is an integer of from 1 to 3; each of n and n' is independently an integer of from 1 to 4; and each G and G' is independently selected from hydroxyl, carboxylic acid or ester, thiocarboxylic acid or ester, acyl halide, isocyanate, acyl azide, acetyl, trihaloacetyl, primary or secondary amine, sulfide, sulfonic acid, sulfonamide, ketone, aldehyde, epoxy, primary or secondary amide, halo, nitro, cyano, anhydride, imide, cyanate, vinyl, ally, acetylene, trihalomethyl, alkoxy, alkyl groups, silicon-containing groups, phosphorus-containing groups, boron-containing groups or combinations thereof.

5. The electronic device of claim 4 wherein the second layer comprises silicon or silicon oxide or a mixture thereof.

6. The electronic device of claim 4 wherein the second layer comprises a metal.

7. The electronic device of claim 6 wherein the metal comprises an alloy of chromium and at least one other metal.

8. The electronic device of claim 4 wherein the second layer comprises a semiconductor.

9. The electronic device of claim 8 wherein the semiconductor comprises germanium arsenide, gallium arsenide or a combination thereof.

10. The electronic device of claim 8, which device is a hard disk drive, an optical disk, an integrated circuit, a capacitor, a multichip module, a wave guide, a liquid crystal display, magnetic tape, magnetic disk, optical recording device, optical or magnetic reading or writing head, ring oscillator, optical filter, photo-voltaic device, thin film display, transducer, circuit board, microwave integrated circuit, microwave transmitter, microwave receiver, amplifier, charge-couple device, optical interconnect, optic sensor, solar cell, or combination thereof.

11. The electronic device of claim 10 wherein the polymer is a dielectric insulator in the device.

12. The electronic device of claim 4 wherein the second layer comprises a polymer of different composition.

13. The electronic device of claim 12 wherein the polymer of different composition comprises synthetic fibers.

14. The electronic device of claim 12 wherein the polymer of different composition comprises epoxy resin, polyimide, benzocyclobutane, polystyrene, polyamide, polycarbonate, polyester, perfluorocyclobutane ring-containing polymer of different composition from the first layer, or a combination thereof.

15. The electronic device of claim 12, which device is a hard disk drive, an optical disk, an integrated circuit, a capacitor, a multichip module, a wave guide, a liquid crystal display, magnetic tape, magnetic disk, optical recording device, optical or magnetic reading or writing head, ring oscillator, optical filter, photo-voltaic device, thin film display, transducer, circuit board, microwave integrated circuit, microwave transmitter, microwave receiver, amplifier, charge-couple device, optical interconnect, optic sensor, solar cell, or combination thereof.

16. The electronic device of claim 15 wherein the polymer is a dielectric insulator in the device.

17. The electronic device of claim 4 wherein the second layer comprises ceramic, paper or quartz, ceramic or a combination thereof.

18. The electronic device of claim 4 wherein the second layer comprises glass.

19. The electronic device of claim 4 wherein the glass comprises comprises ceramitized glass.

20. The electronic device of claim 4 wherein the second layer comprises barium ferrite.

21. The electronic device of claim 4 wherein the the second layer is an optical fiber.

* * * * *